United States Patent
Takahashi et al.

(10) Patent No.: US 8,087,377 B2
(45) Date of Patent: Jan. 3, 2012

(54) COATING APPARATUS

(75) Inventors: Naoto Takahashi, Shunan (JP);
Atsuyuki Kohno, Shunan (JP); Shuhei Yamamoto, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 782 days.

(21) Appl. No.: 12/084,460

(22) PCT Filed: Oct. 31, 2006

(86) PCT No.: PCT/JP2006/322215
§ 371 (c)(1),
(2), (4) Date: Sep. 12, 2008

(87) PCT Pub. No.: WO2007/052815
PCT Pub. Date: May 10, 2007

(65) Prior Publication Data
US 2009/0133625 A1      May 28, 2009

(30) Foreign Application Priority Data

Nov. 4, 2005 (JP) ................... 2005-320634
Nov. 30, 2005 (JP) ................... 2005-346512

(51) Int. Cl.
*B05C 5/02* (2006.01)
(52) U.S. Cl. .......... 118/66; 118/712; 118/641; 118/642; 118/643; 118/52; 118/320; 118/323
(58) Field of Classification Search .................... 118/66, 118/58, 712, 323, 641–643, 52, 319, 320; 427/164, 165
See application file for complete search history.

(56) References Cited

U.S. PATENT DOCUMENTS

| | | | |
|---|---|---|---|
| 5,246,499 A * | 9/1993 | Peralta et al. ................. | 118/641 |
| 5,411,588 A * | 5/1995 | Diepens et al. ............... | 118/666 |
| 5,820,673 A * | 10/1998 | Sentilles et al. .............. | 118/319 |
| 5,917,586 A | 6/1999 | Ikezawa | |
| 6,013,372 A | 1/2000 | Hayakawa et al. | |
| 6,326,054 B1 * | 12/2001 | Smith et al. .................. | 427/168 |
| 7,267,436 B2 | 9/2007 | Ito et al. | |
| 2008/0003356 A1 | 1/2008 | Samukawa et al. | |

FOREIGN PATENT DOCUMENTS

| | | |
|---|---|---|
| JP | 1-282819 A | 11/1989 |
| JP | 4-200768 A | 7/1992 |
| JP | 9-230108 A | 9/1997 |
| JP | 9-257644 A | 10/1997 |

(Continued)

*Primary Examiner* — Laura Edwards
(74) *Attorney, Agent, or Firm* — Birch, Stewart, Kolasch & Birch, LLP

(57) ABSTRACT

The present invention provides a coating apparatus which can form a stable photochromic coating film. In the invention, a centering device, a lens height measuring device, a primer fluid applicator device, a primer spinning device, a drying device, a photochromic fluid applicator device, a photochromic spinning device, a UV device and a lens transport means comprising a pair of handling devices are provided to a coating apparatus. In the coating apparatus, it is possible to produce many photochromic lenses more efficiently by arranging devices and the lens transport means in such a manner that lens support portions of the centering device, the lens height measuring device, the primer spinning device, and the lens drying device are disposed inside the track of one handling device of the lens transport means, lens support portions of the UV device are disposed inside the track of the other handling device of the lens transport means, and the lens support portion of the photochromic spinning device is disposed inside both of the tracks.

12 Claims, 18 Drawing Sheets

FOREIGN PATENT DOCUMENTS

| | | |
|---|---|---|
| JP | 9-258003 A | 10/1997 |
| JP | 10-135101 A | 5/1998 |
| JP | 10-178008 A | 6/1998 |
| JP | 2004-290857 A | 10/2004 |
| JP | 2004-295114 A | 10/2004 |
| JP | 2005-13873 A | 1/2005 |
| JP | 2005-218994 A | 8/2005 |
| JP | 2005-246267 A | 9/2005 |
| WO | WO 2005/001552 A1 | 1/2005 |
| WO | WO 2005/075109 A1 | 8/2005 |

\* cited by examiner

COATING APPARATUS

TECHNICAL FIELD

This invention relates to a coating apparatus which can perform, for example, high quality photochromic coating of a lens for spectacles, etc.

BACKGROUND ART

Among materials which change in color when exposed to light is a photochromic substance. The photochromic substance has the property that its structure reversibly changes according to the presence or absence of ultraviolet radiation to change in absorption spectrum. This property results from the nature that when an isomer is irradiated with light of a particular wavelength, the single chemical substance, under the action of light, reversibly produces an isomer having a different absorption spectrum. The resulting different isomer is restored to the color of the original isomer by heat or light of a different wavelength.

Photochromic spectacles utilize the above nature of the photochromic material for lenses. In an outdoor environment exposed to light including ultraviolet radiation, such as sunlight, the photochromic spectacles have their lenses rapidly colored to function as sunglasses. In an indoor environment without exposure to light, the lenses fade to function as ordinary transparent spectacles.

Known methods for producing a lens having photochromic property include a method of impregnating the surface of a non-photochromic lens with a photochromic compound; a method dissolving a photochromic coating fluid in a monomer, and polymerizing the solution to obtain a photochromic lens directly; and a method providing a layer having photochromism on the surface of a lens with the use of a coating agent containing a photochromic compound.

Of the above-described methods for producing a lens, the coating method, which coats a photochromic coating fluid onto a lens, involves ejecting a photochromic coating fluid from the nozzle of a barrel containing the photochromic fluid to the surface of the lens, while rotating the lens, to carry out spin coating, thereby forming a coating layer on the surface of the lens. For example, the technology of Japanese Unexamined Patent Publication No. 2000-334369 is available as an apparatus which can coat a plurality of lenses continuously, and the technology of Japanese Unexamined Patent Publication No. 2005-013873 is available as an apparatus equipped with an auxiliary mechanism for spreading a coating fluid on a lens with the use of a flexible film.

In spin coating with the photochromic coating fluid, it is not necessary to change the setting of the apparatus, if the lens of the same type and the same size and having the same gradient is to be coated. However, if the coating fluid is to be applied to the lens different in size and gradient, it is necessary to adapt the apparatus to the shape of the lens. In this case, if the height and gradient of the lens are known beforehand, the setting of the apparatus can be adapted to their pattern. If the height and gradient of the lens are unknown, it is common practice to investigate the height and gradient of the lens anew, and then adjust the height of the lens or the height of the nozzle in accordance with a position suited to the lens. In spin coating the lens with the photochromic coating fluid having high viscosity, moreover, the problem arises that even in the presence of centrifugal force during rotation, the coating fluid builds up at a peripheral edge portion of the lens, and drops onto the side surface of the lens.

The present invention has been accomplished in the light of such circumstances. It is an object of the invention to provide a coating apparatus which can detect the height and gradient of a lens automatically and easily, and can form a stable photochromic coating film.

DISCLOSURE OF THE INVENTION

The coating apparatus of the present invention, for attaining the above object, is a coating apparatus comprising: a centering device for determining a center of a lens; a lens height measuring device for measuring a gradient of the lens ranging from a center on a face side of the lens to an edge portion on the face side of the lens; a primer fluid applicator device for coating a primer coating fluid onto the face side of the lens by an ejection nozzle; a primer spinning device for rotating the lens coated with the primer coating fluid at a rotational speed conformed to the gradient of the lens; a drying device for drying the primer coating fluid coated onto the lens; a photochromic fluid applicator device for coating a photochromic coating fluid onto a primer film coated onto the lens; a photochromic spinning device for rotating the lens coated with the photochromic coating fluid at a rotational speed conformed to the gradient of the lens; and a UV device for irradiating the lens, which has been coated with the photochromic coating fluid, with UV light in a nitrogen atmosphere to cure a coating layer, wherein each of the centering device, the lens height measuring device, the primer spinning device, the drying device, the photochromic spinning device, and the UV device has a lens support portion for supporting the lens, and a lens transport means capable of transferring the lenses is provided.

In an embodiment of the above-described invention, the centering device, the lens height measuring device, the primer spinning device, the drying device, the photochromic spinning device, and the UV device are being divided into a former group and a latter group according to a sequence of a coating operation for the lens; the lens transport means comprises a pair of handling devices each having an arm-shaped member pivoting about a shaft; each of lens support portions of devices belonging to the former group is being disposed inside a track of one of the handling devices of the lens transport means, and each of lens support portions of devices belonging to the latter group is being disposed inside a track of the other handling device of the lens transport means; and of the respective lens support portions of the former group, the lens support portion used finally in the sequence of the operation is being disposed not only inside the track of the handling device but inside the track of the other handling device.

In an embodiment of the above-described invention, the former group includes the centering device, the lens height measuring device, the primer spinning device, the lens drying device, and the photochromic spinning device, the latter group includes the UV device, and the lens support portion of the photochromic spinning device is disposed inside the tracks of both the one handling device and the other handling device.

In an embodiment of the above-described invention, a plurality of the lens support portions of the lens drying device can be arranged, and a plurality of the UV devices can be arranged.

In an embodiment of the above-described invention, a lens height difference between two points at a center of a lens surface of the lens supported by the centering jig and at other location on the lens surface spaced from the center is detected by a sensor provided in the lens height measuring sensor.

In an embodiment of the above-described invention, the lens height measuring device comprises at least one set of a light emitter for emitting a light and a light receiver for detecting the light emitted from the light emitter, and the height of the lens is determined based on an information resulting from interruption of the light detecting at the light receiver by the lens.

In an embodiment of the above-described invention, the primer coating fluid is coated onto the surface of the lens while the ejection nozzle of the primer fluid applicator device is being moved at a distance from, and along, a straight line connecting the center of the surface of the lens to an edge portion of the surface of the lens.

In an embodiment of the above-described invention, the coating apparatus further comprising a coating film uniformizing device having a flexible film for spreading the photochromic coating fluid on the surface of the lens, wherein the coating film uniformizing device spreads the photochromic coating fluid on the surface of the rotating lens by moving the flexible film along a linear track connecting a central portion of an upper surface of the lens to an edge portion of the upper surface of the lens and by contacting an edge portion of the flexible film with the photochromic coating fluid during the movement.

In the above-described invention, one of the lens support portions can be formed to be movable, and two of the respective lens support portions can be rendered common by the one lens support portion.

In the above-described invention, it is preferred that the coating apparatus further comprising a cleaning nozzle for cleaning a back of the lens supported by the primer spinning device by discharging a solvent toward the back of the lens.

In the above-described invention, it is preferred that the coating apparatus further comprising a waiting tank provided within a range of movement of the ejection nozzle of the primer coating device, wherein the waiting tank stores a solvent for preventing solidification of the primer coating fluid by dipping the ejection nozzle of the primer coating device in the solvent when the ejection nozzle is not in operation.

In the above-described invention, it is preferred that the coating apparatus further comprising a spatula disposed in surroundings of the photochromic spinning device, wherein the spatula is capable to contact with a side surface of the lens supported by the photochromic spinning device during coating with the photochromic coating fluid.

BEST MODE FOR CARRYING OUT THE INVENTION

A coating apparatus according to the embodiment of the present invention will now be described with reference to the accompanying drawings.

Figure 1:
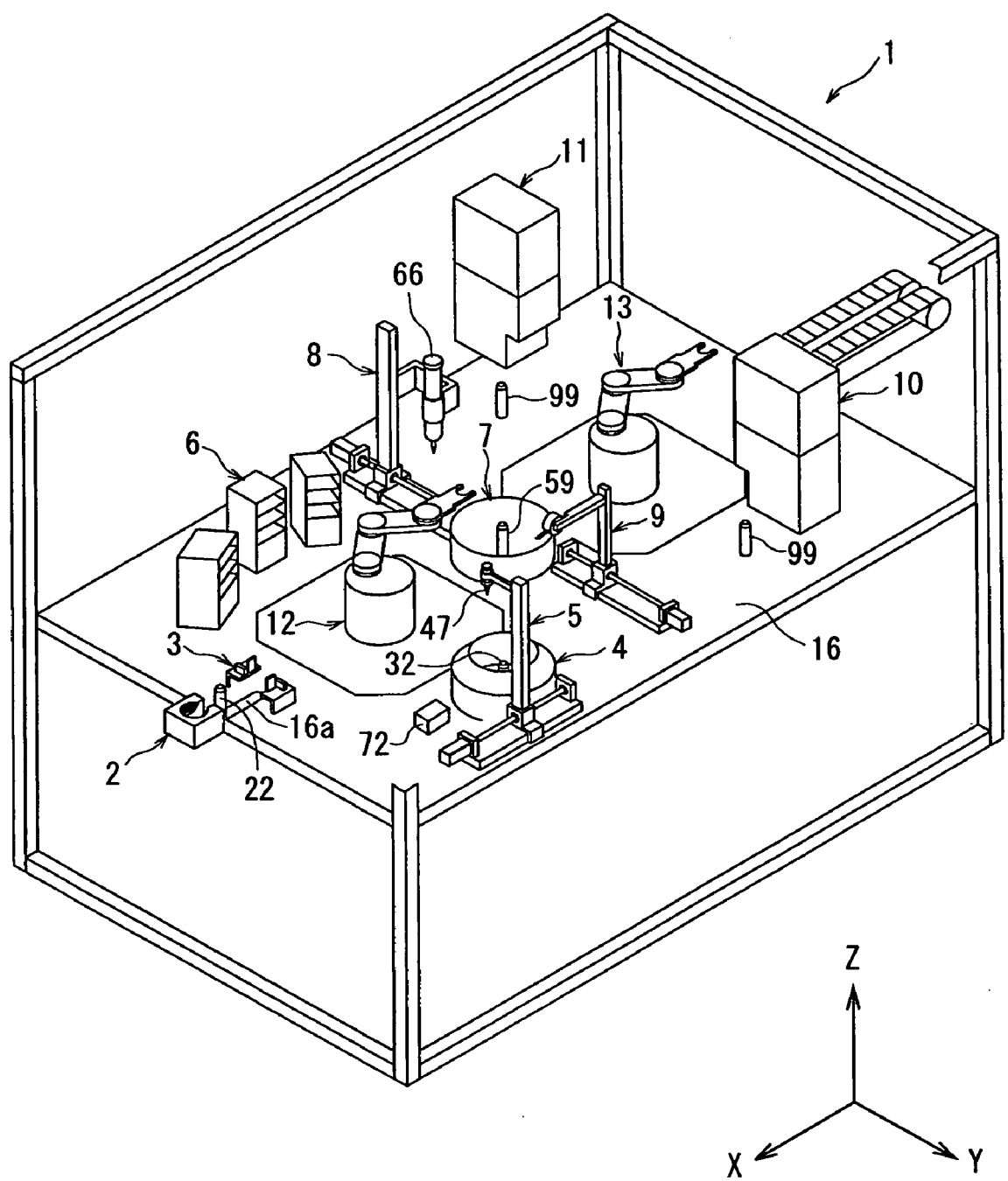
FIG. 1 is a perspective view showing the whole of a coating apparatus according to an embodiment of the present invention.

Herein, the description is presented, with the X-axis direction of the coating apparatus of FIG. 1 being the width direction of the coating apparatus, the Y-axis direction of the coating apparatus being the front-to-rear direction, and the Z-axis direction of the coating apparatus being the up-and-down direction.

A coating apparatus 1 shown in FIG. 1 is an apparatus for forming a coating film on a lens. The apparatus for coating treatment is an apparatus for performing primer coating treatment (may hereinafter be referred to as primer coating) and photochromic coating treatment (may hereinafter be referred to as photochromic coating) in a photochromic coating process starting with lens cleaning as pretreatment and ending with annealing shown the flowchart of FIG. 2.

The coating apparatus 1 is equipped with a centering device 2 for determining, mainly, the central position of the lens, a lens height measuring device 3 for measuring the height and gradient of the lens, a primer spinning device 4 for supporting and rotating the lens during primer coating, a primer fluid applicator device 5 for coating a primer coating fluid onto the surface of the lens, a lens drying device 6 for drying the coating fluid coated onto the lens, a photochromic spinning device 7 for supporting and rotating the lens during photochromic coating, a photochromic fluid applicator device 8 for coating a photochromic coating fluid onto the surface of the lens, a coating film uniformizing device 9 for rendering constant the film thickness of the coating fluid on the lens, UV devices 10, 11 for curing the coating fluid, and a pair of handling devices 12 and 13 for transporting the lens.

Figure 3:
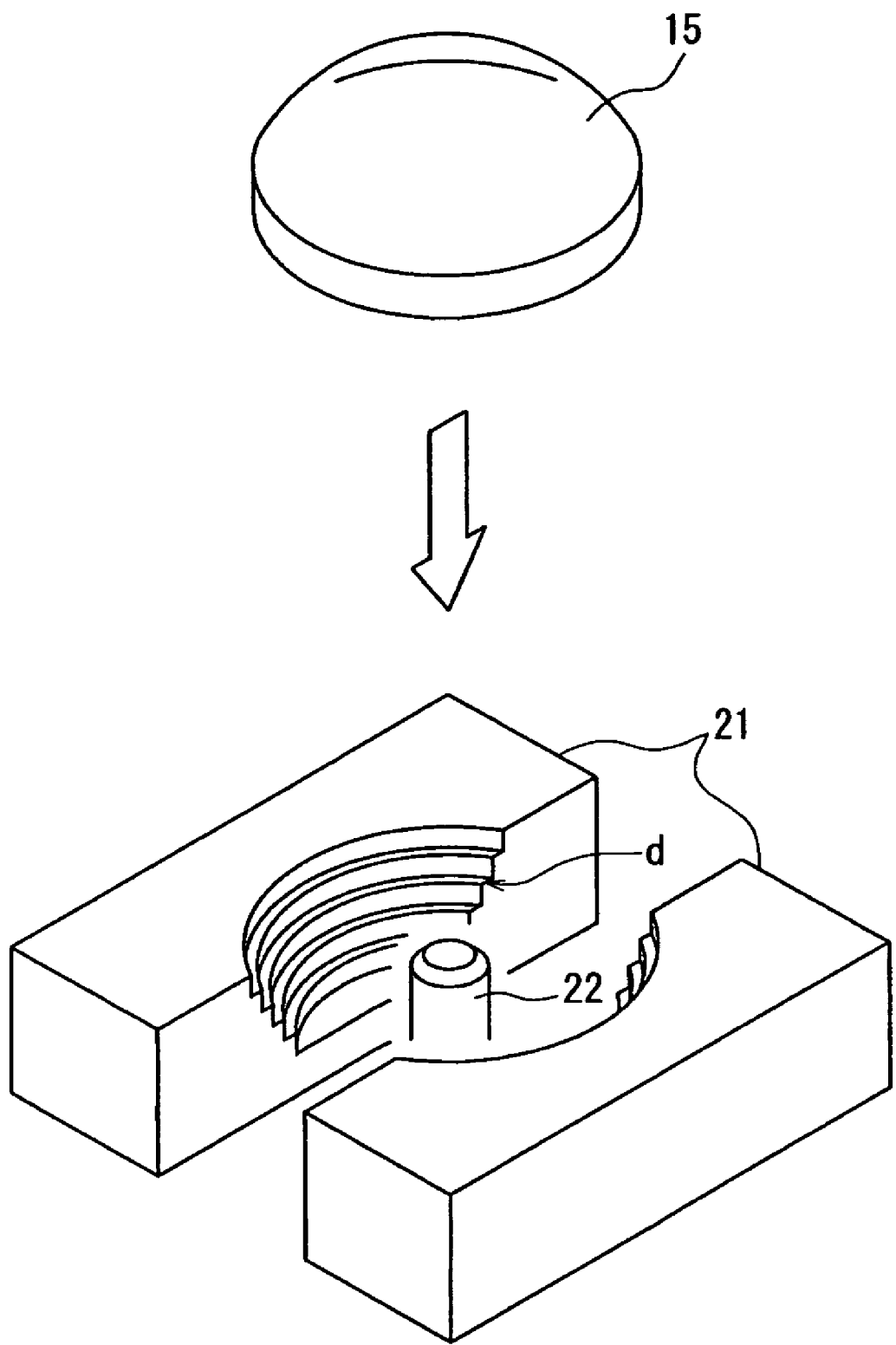
FIG. 3 is a perspective view of a centering device disposed in the coating apparatus of FIG. 1.
Figure 4:
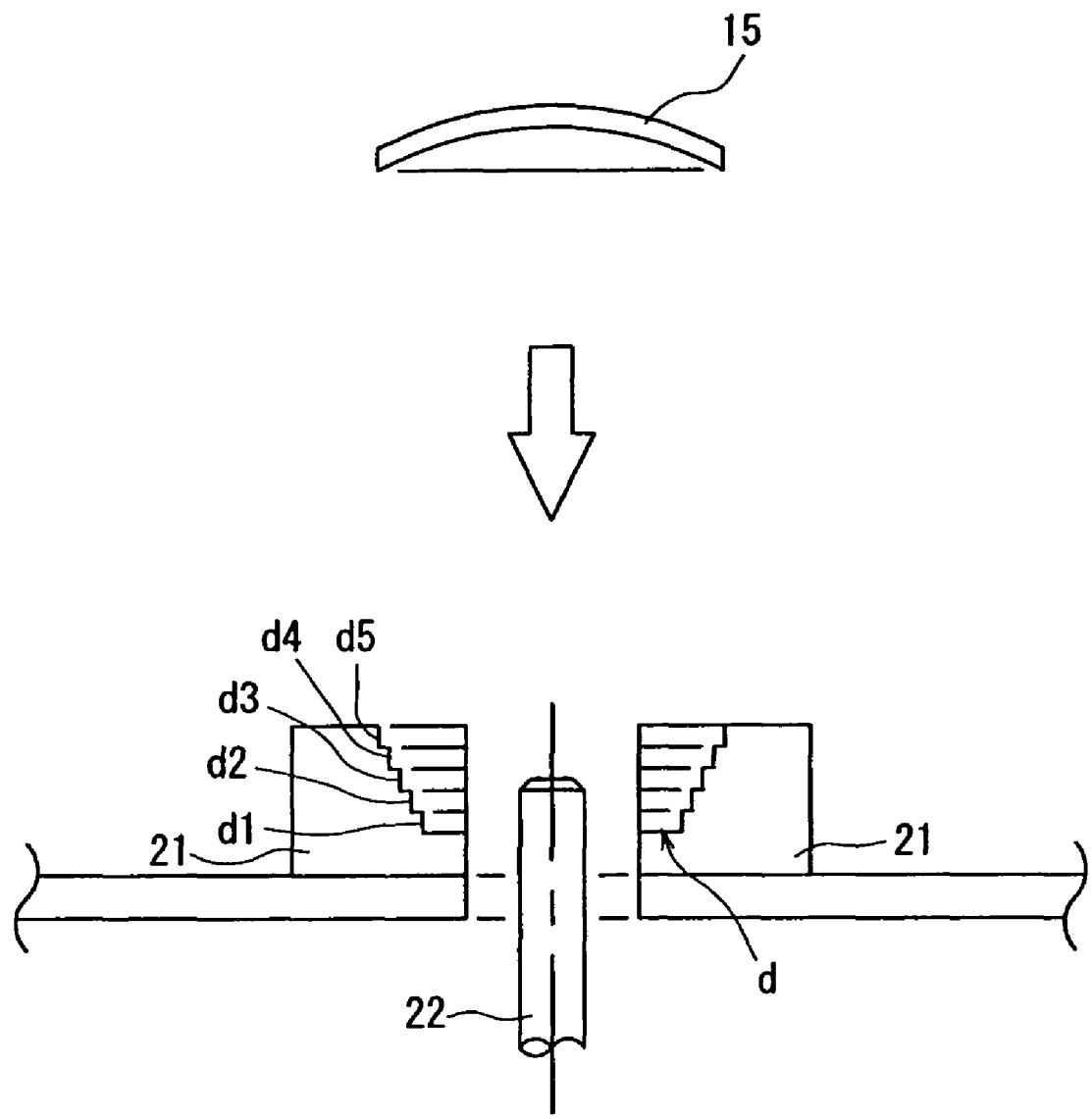
FIG. 4 is a sectional view of the centering device disposed in the coating apparatus of FIG. 1.

FIGS. 3 and 4 show the centering device 2 for the lens, and the centering device 2 is disposed in a left side portion of a base stand 16 of the coating apparatus 1. The centering device 2 has a nearly rectangular outer peripheral shape in the horizontal direction and, in a plan view as viewed from above, has a pair of block plates 21 provided at a distance from each other, each block plate 21 having an arcuate curved surface at the center. A stair-shaped stepped portion d comprising concentrically arranged stepped portions for centering a lens 15 is formed in each of the block plates 21. The stepped portion d comprises the stepped portions d1, d2, d3, d4 and d5 formed in conformity with the outer peripheral shapes of the lenses 15 of various sizes. The stepped portion d1 is located at the lowermost position, and the stepped portions d2, d3, d4, and d5 are located in this order from below to above, whereby the lenses ranging from the small-diameter lens to the large-diameter lens can be centered.

An centering operation is performed by abutting a lower edge portion of the lens 15 (a back edge portion of the lens) against any of the stepped portions d1 to d5 conforming to the sizes of the respective lenses 15, whereby the central position of the lens 15 is determined. This positional determination by the centering device 2 provides a reference for the centering of the lens 15 in subsequent operations. At the stepped portion d of the centering device 2, the lens 15 is placed manually.

A centering rod 22 of a circular transverse section is provided at the center of the stepped portions d of the pair of block plates 21. The centering rod 22 is erected, with its leading end portion facing upward, and the central position of the centering rod 22 is in agreement with the center of the stepped portions d1 to d5. The centering rod 22 is arranged to be capable of supporting the lens 15, which has been placed in the stepped portion d and centered, by the leading end portion of the centering rod 22 by raising the centering rod 22. Therefore the centering rod 22 works as a lens support portion of the centering device 2.

The centering rod 22 can be moved up and down by an elevating device (not shown) provided on the side surface of the base stand 16, and can be moved laterally between the centering device 2 and the lens height measuring device 3 via 16a formed in the base stand 16. Therefore the centering rod 22 works as a lens support portion of the lens height measuring device 3.

Figure 5:
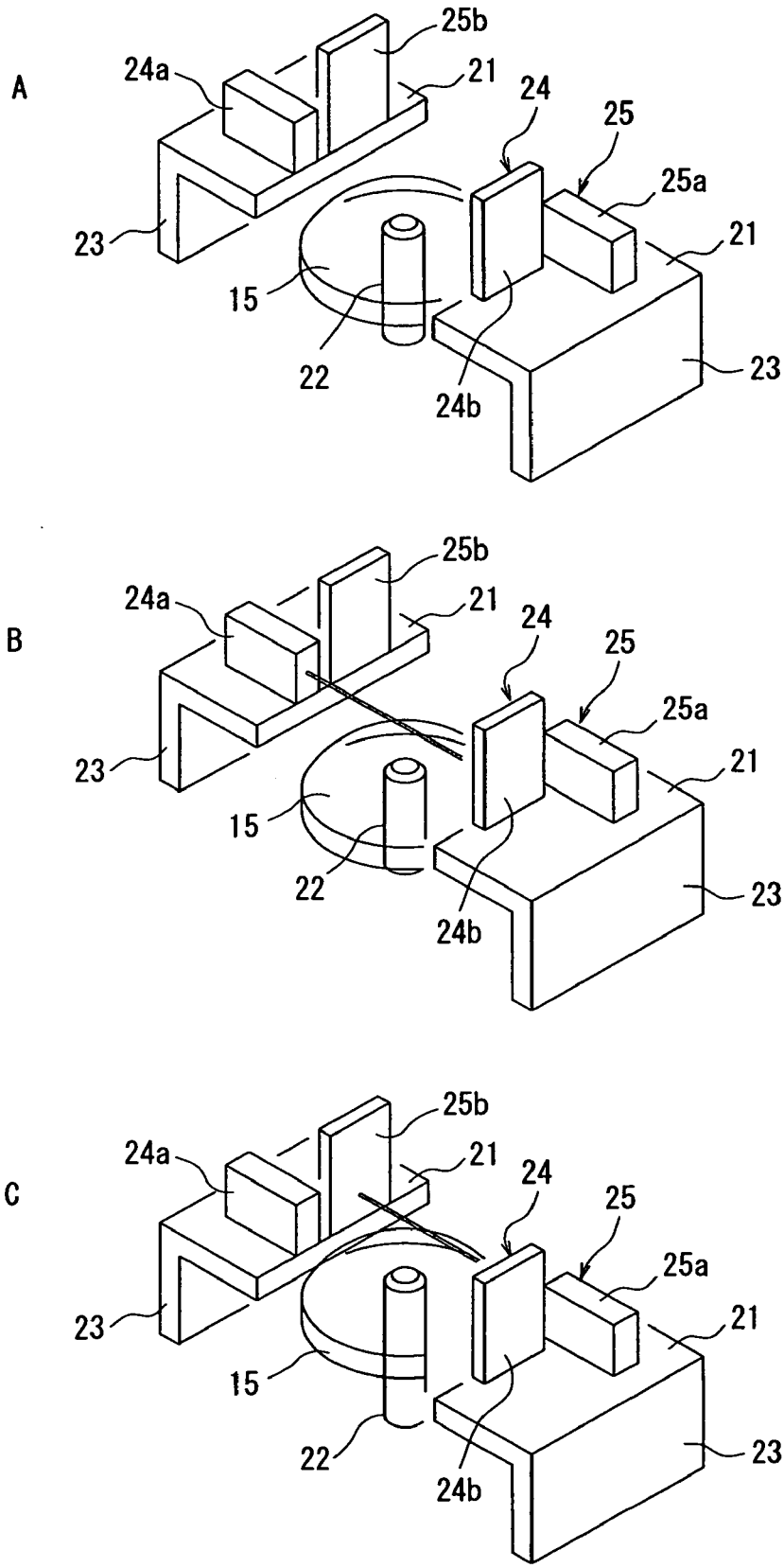
FIG. 5A is a perspective view of a state in which a lens is set in a lens height measuring sensor shown in FIG. 1.
FIG. 5B is a perspective view of a state in which the center of the lens is detected by one sensor unit.
FIG. 5C is a perspective view of a state in which a location of the lens other than the center is detected by the other sensor unit.

FIGS. 5A to 5C show the lens height measuring sensor 3.

The lens height measuring device 3 is provided with a pair of support brackets 23 disposed on the base stand 16, the support brackets 23 confronting each other at a distance. Two sensor units 24 and 25 are disposed on the upper surface of the support brackets 23. Sensors 24a, 25a of the sensor units 24, 25 each have a light emitting portion (a light emitter) and a light receiving portion (a light receiver), and the light emitting portion throws laser light. Mirrors (photoreflectors) 24b, 25b reflect the laser light, and the receiving portions of the sensors 24a, 25a can receive the reflected laser light.

The sensor units 24, 25 comprise the sensors 24a, 25a and the mirrors 24b, 25b disposed to be staggered and opposed. A line connecting one sensor 24a and one mirror 24b, and a line connecting the other sensor 25a and the other mirror 25b are arranged at the same horizontal height position and in parallel. The lens 15, which has been transported from the centering device 2 by the centering rod 22, is placed between the sensors 24a, 25a and the mirrors 24b, 25b. The sensor units 24, 25 detect the presence or absence of the lens 15 and the reference height of the lens surface from the base stand 16 such that when the lens 15 is placed between the sensors 24a, 25a and the mirrors 24b, 25b, laser light is crooked by the lens 15 and thereby blocked.

Figure 6:
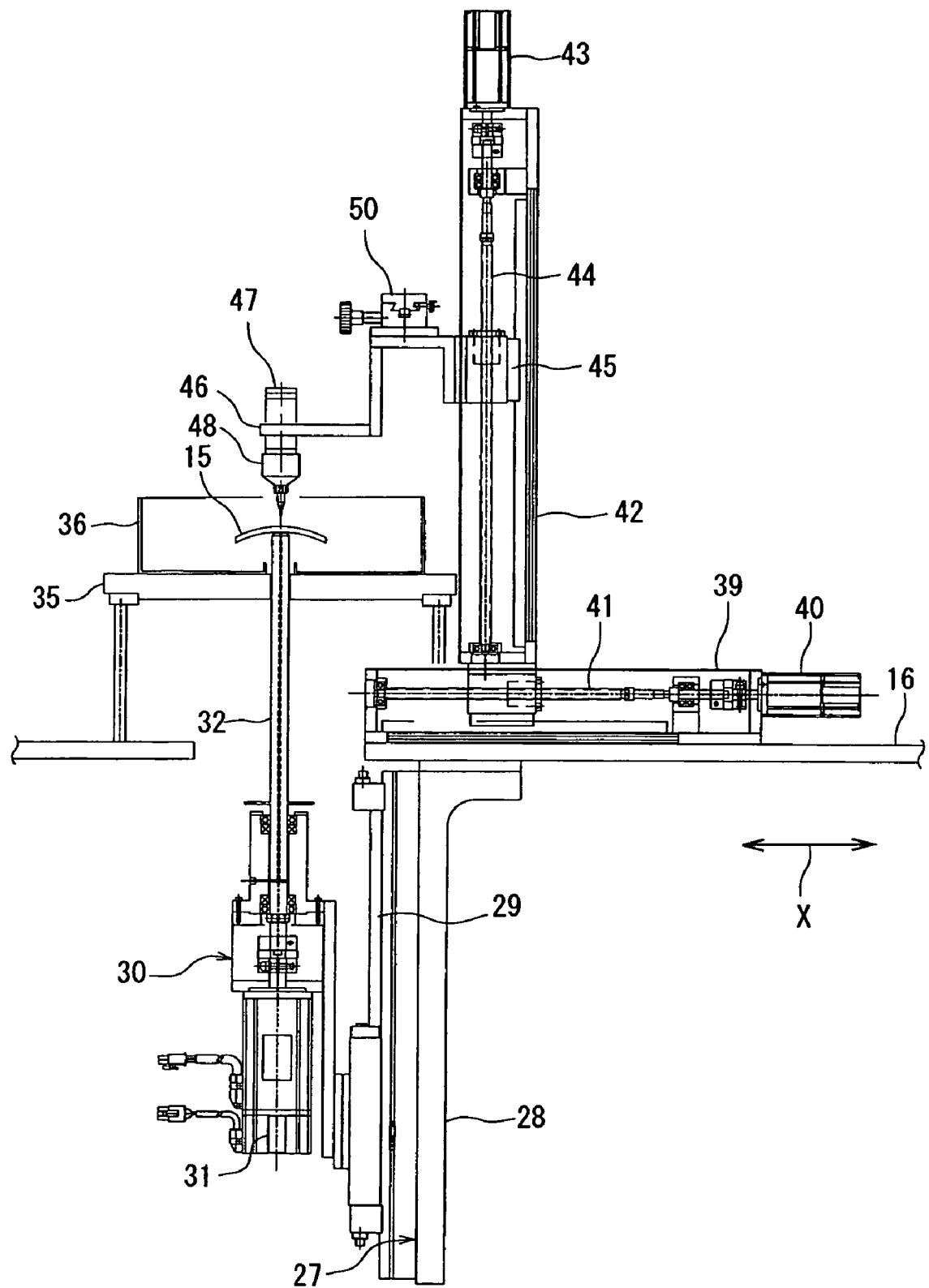
FIG. 6 is a sectional view showing a state in which the lens supported by a spinning shaft of a primer-side lens support device of FIG. 1 is coated by a primer applicator device.

FIG. 6 shows the primer spinning device 4 and the primer fluid applicator device 5.

An elevating unit 27 of the primer spinning device 4 is disposed inwardly of the base plate 16. The elevating unit 27 has a base stand-side support plate 28 fixed to the base stand 16. A guide rail 29 is vertically provided on the base stand-side support plate 28, and an elevating block 30 is fitted to the guide rail 29. The elevating block 30 can be moved up and down along the guide rail 29 by an air pressure means using a rodless cylinder (not shown). Instead of the air pressure means of the air type, means of the ball screw type, chain type, magnet type, slit type, or wire type can be applied (the same is true of cylinders to follow).

Figure 7:
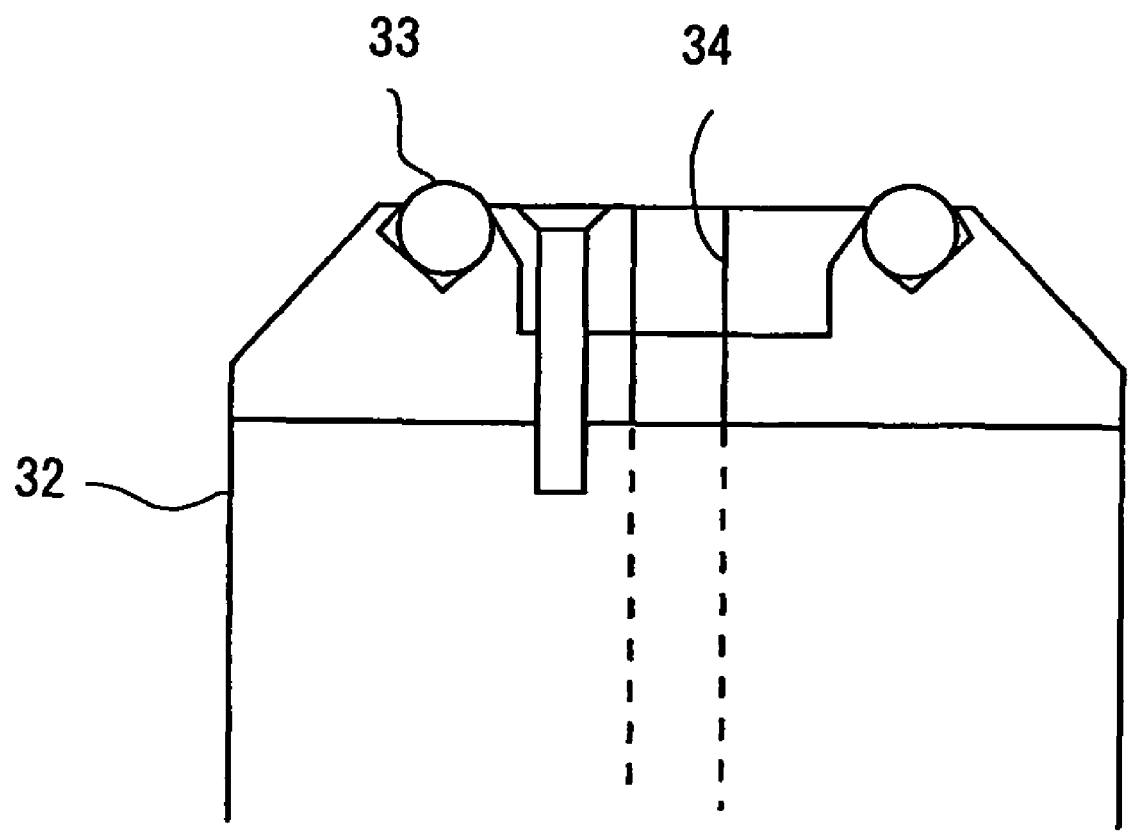
FIG. 7 is a sectional view of a leading end portion of the spinning shaft of the primer-side lens support device of FIG. 6.

The elevating block 30 is provided with a servo motor 31, and a rotating shaft is provided on the upper side of the servo motor 31. The rotating shaft is connected to a spinning shaft 32 having a front end portion facing upward. An O-ring 33 is mounted in an upper end portion of the spinning shaft 32, as shown in FIG. 7. An attraction hole 34 is provided in a central portion of the spinning shaft 32, and the attraction hole 34 is connected to an air suction means (not shown) to be capable of attracting the lens 15 by suction. Therefore the spinning shaft 32 works as a lens support portion of the primer spinning device 4.

A pedestal 35 is disposed on the base stand 16 around the spinning shaft 32, and a recovery tray 36 for the coating fluid is provided on the pedestal 35. The spinning shaft 32 penetrates the recovery tray 36 and the pedestal 35, and protrudes upward from the bottom surface of the recovery tray 36.

FIG. 6 shows the primer applicator device 5.

As shown in the drawing, an X-axis guide unit 39 extends in the X-axis direction on the base stand 16. The X-axis guide unit 39 is screwed to an X-axis ball screw 41 connected to a servo motor 40, and a slide unit 42 is screwed to the X-axis ball screw 41. When the servo motor 40 is driven, the slide unit 42 can move forward and backward in the X-axis direction.

The slide unit 42 is mounted with a Z-axis ball screw 44 which is connected to a rotating shaft of the servo motor 43 and extends in the up-and-down direction. An elevating block 45 which is screwed to a threaded portion of the Z-axis ball screw 44 is mounted on the Z-axis ball screw 44. When the servo motor 43 is driven, the elevating block 45 is moved upward and downward. The elevating block 45 is mounted with a crank-shaped support member 46. A dispensing valve 47 is mounted on a leading end portion of the support member 46, and a nozzle 48 for ejecting the coating fluid is disposed in a lower end portion of the dispensing valve 47, with the tip of the nozzle 48 facing directly below. An adjusting slider 50 for adjusting the position of the nozzle 48 in the Y-axis direction is mounted on the support member 46. The central position of the nozzle 48, and the central position of the spinning shaft 32 of the primer-side lens support device 4 can be adjusted using the slide unit 42 and the slider 50.

Figure 8:
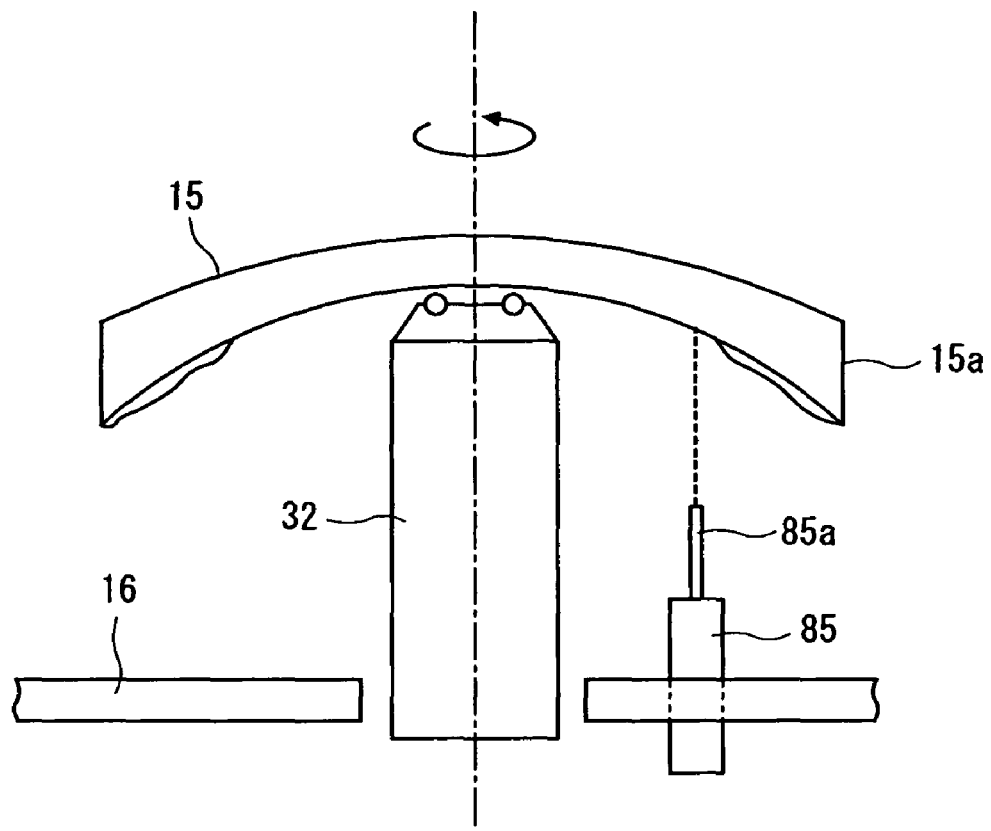
FIG. 8 is a sectional view of the surroundings of a cleaning nozzle portion for cleaning a primer coating fluid.

FIG. 8 shows a back cleaning nozzle 85 for the lens 15. The back cleaning nozzle 85 is provided in a side portion of the spinning shaft 32, and is arranged to be positioned directly below the lens 15 supported by the spinning shaft 32. The back cleaning nozzle 85 is connected to a supply source of a solvent (not shown), and is adapted to gush the solvent arbitrarily by opening and closing of a shielding means (not shown) for the nozzle. The back cleaning nozzle 85 protrudes upwardly of the base stand 6 through a through-hole provided in the base stand 16, and has a jet nozzle 85a pointed in the vertical direction (optionally, inclined). When the lens 15 is supported by the spinning shaft 32, the back cleaning nozzle 85 can gush the solvent toward the back of the lens 15.

Figure 9:
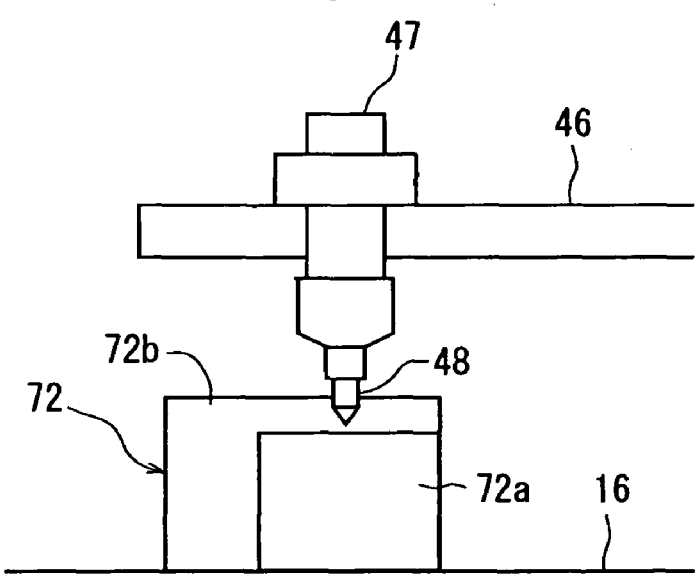
FIG. 9 is a sectional view of a waiting tank for preventing drying of a coating fluid at a tip portion of a nozzle provided in the coating apparatus of FIG. 1.

A nozzle waiting tank 72 for dipping the nozzle 48 of the dispensing valve 47 shown in FIG. 9 is provided on the base stand 16 of the coating apparatus 1, and a solvent is stored in the interior of the nozzle waiting tank 72. The position of the nozzle waiting tank 72 is set sideways with respect to the primer-side lens support device 4. When the primer applicator device 5 is not in operation, the tip of the nozzle 48 of the dispensing valve 47 is dipped in the solvent contained in the nozzle waiting tank 72. When the servo motor 43 is driven, the elevating block 45 is moved upward along the slide unit 42. In accordance with this upward movement, the dispensing valve 47 is moved upward. When the servo motor 40 of the X-axis guide unit 39 is driven, the dispensing valve 47 is moved in the X-axis direction to position the nozzle 48 directly above the center of the spinning shaft 32. Then, the servo motor 43 is driven again, whereby the height of the nozzle 48 can be adapted for the lens 15 and adjusted to a height during coating with the coating fluid.

The interior of the nozzle waiting tank 72 is partitioned into two compartments, i.e., a solvent tank 72a and an overflow tank 72b. The nozzle waiting tank 72 is structured such that the solvent is supplied into the solvent tank 72a, and a surplus of the solvent flows into the overflow, tank 72b to keep constant the height of the fluid level of the solvent in the solvent tank 72a. The nozzle waiting tank 72 may have a fluid level sensor for detecting a decrease in the solvent, or a mechanism for supplementing the decreased solvent in the solvent tank 72 automatically.

Figure 10:
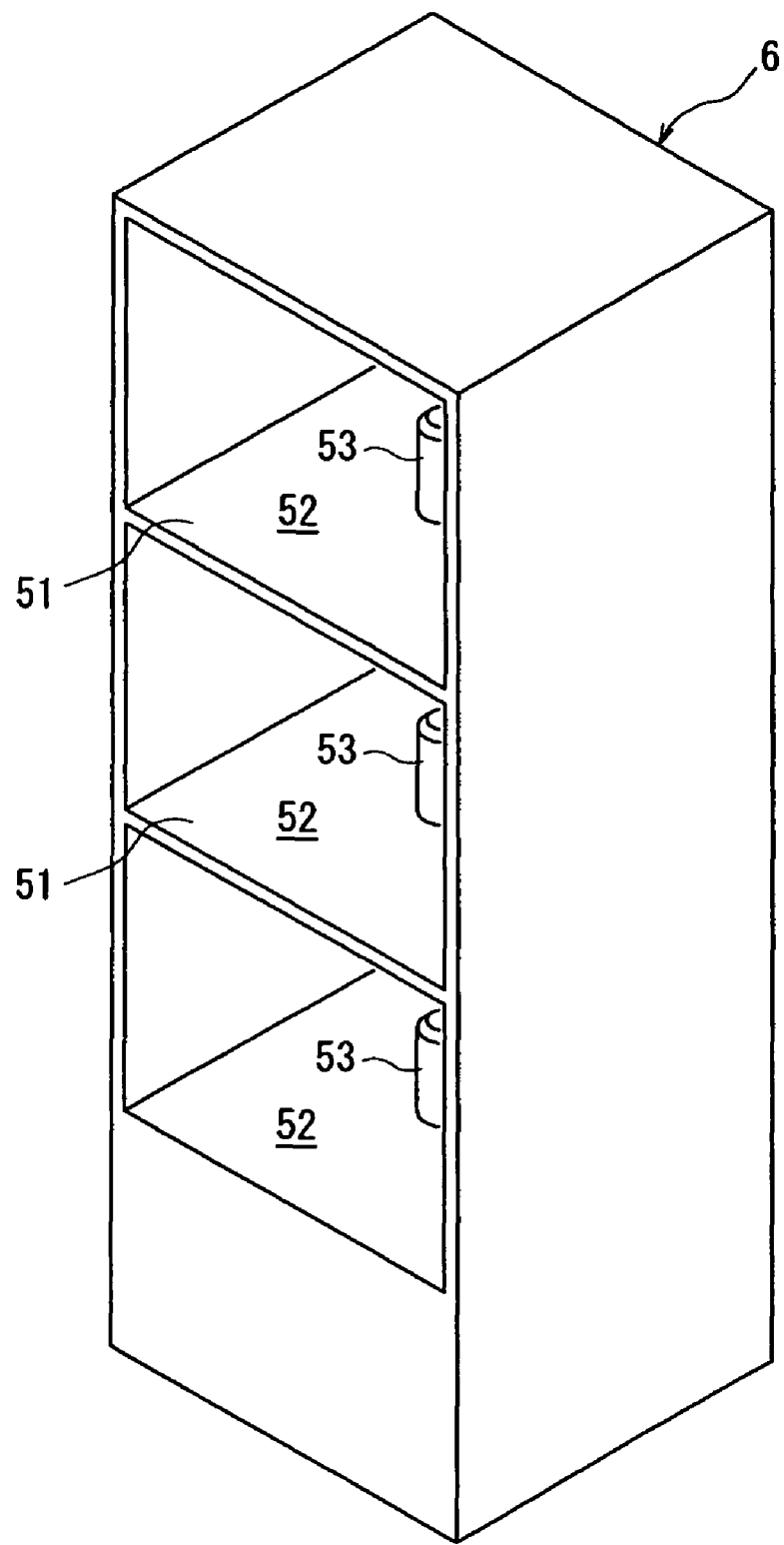
FIG. 10 is a perspective view of a lens drying box provided in the coating apparatus of FIG. 1.
Figure 11:
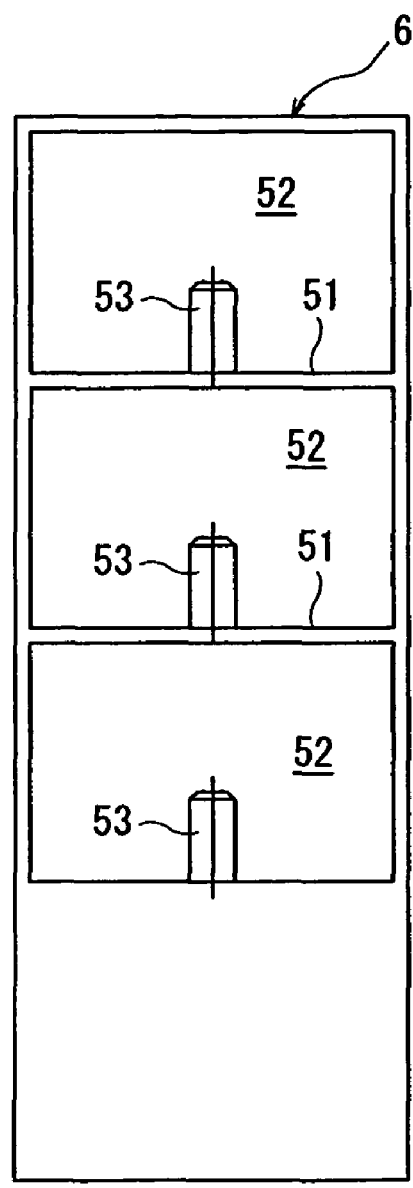
FIG. 11 is a front view of the lens drying box provided in the coating apparatus of FIG. 1.

FIGS. 10 and 11 show the lens drying device 6.

In the present embodiment, the lens drying device 6 consisting of three lens drying boxes is disposed. Each of the lens drying boxes is partitioned in the up-and-down direction by two partition plates 51 to provide three accommodation chambers 52, thus forming a total of nine accommodation chambers 52. Each of the accommodation chambers 52 has an opening facing toward one of the handling devices 12. At the bottom of each accommodation chamber 52, a lens support shaft 53 is erected vertically and can be arranged to place the lens 15 on an upper end portion of the lens support shaft 53. Therefore the lens support shaft 53 works as a lens support portion of the lens drying device 6.

Figure 12:
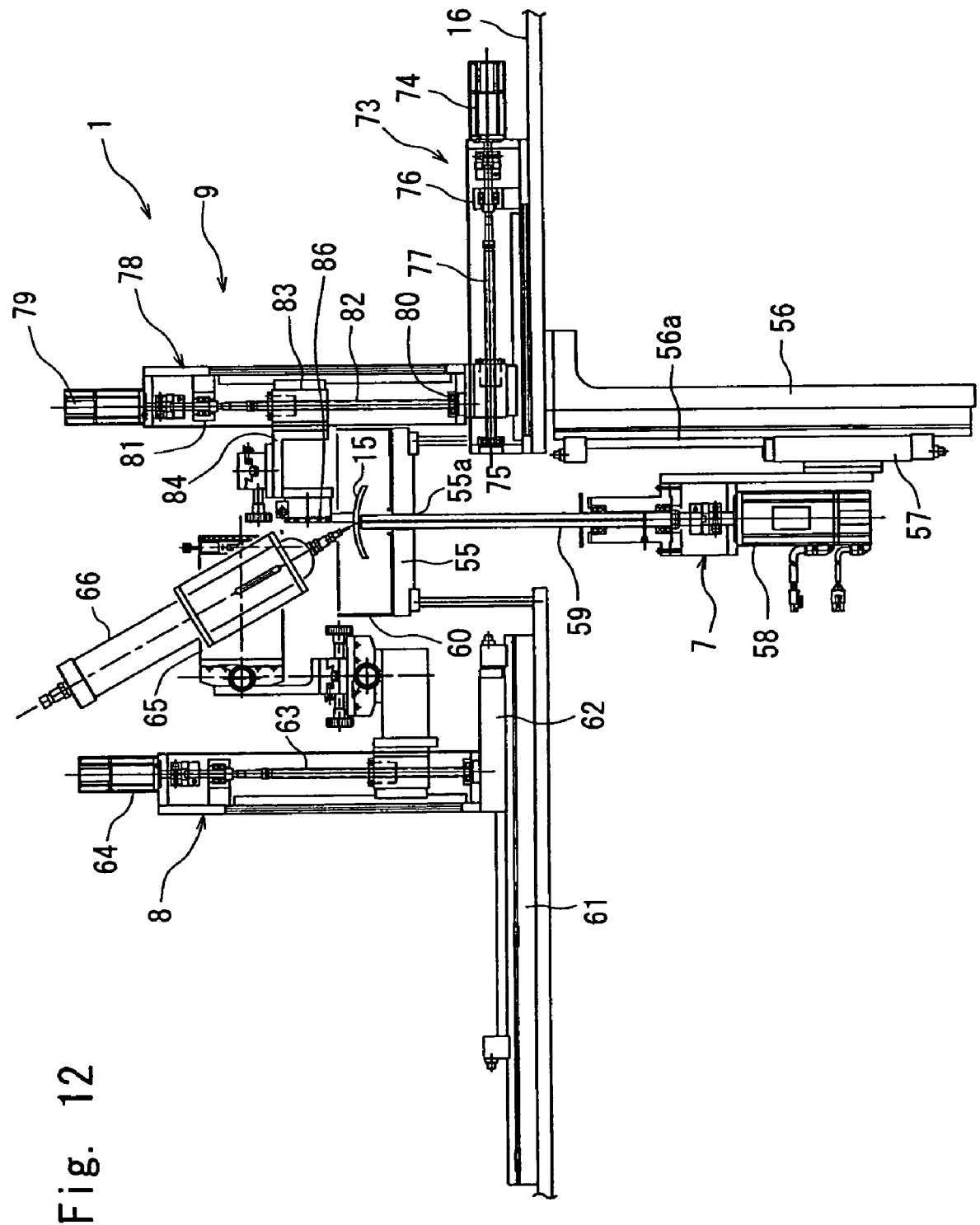
FIG. 12 is a sectional view showing a state in which the lens supported by a spinning shaft of a photochromic-side lens support device of FIG. 1 is coated by a photochromic fluid applicator device.

FIG. 12 shows the photochromic coating spinning device 7, the photochromic fluid applicator device 8, and the coating film uniformizing device 9 for the coating fluid.

The photochromic coating spinning device 7 forms a circular pedestal 55 provided at a nearly central portion of the base stand 16, and protruding upwardly from the base stand 16. A guide rail 56 is provided inwardly of the base stand 16. A lens support member 57, which slides on a rail 56a of the guide rail 56 in the up-and-down (vertical) direction under an air pressure force (not shown), is provided on the guide rail 56. A servo motor 58 is fixed to the lens support member 57, and a spinning shaft 59 extending upward is mounted on the servo motor 58. The spinning shaft 59 penetrates a hole 55a formed in the circular pedestal 55. An O-ring is mounted in an upper end portion of the spinning shaft 59, as in the case of the spinning shaft 32 of the primer-side lens support device 4 shown in FIG. 7. An attraction hole is provided in a central portion of the spinning shaft 59, and the attraction hole is connected to an air suction means (not shown) to be capable of attracting the lens 15 by suction and supporting the lens 15 thereby. Therefore the spinning shaft 59 works as a lens support portion of the photochromic spinning device 7. A tray 60 for recovering the photochromic coating fluid is disposed in the surroundings of the spinning shaft 59.

Figure 13:
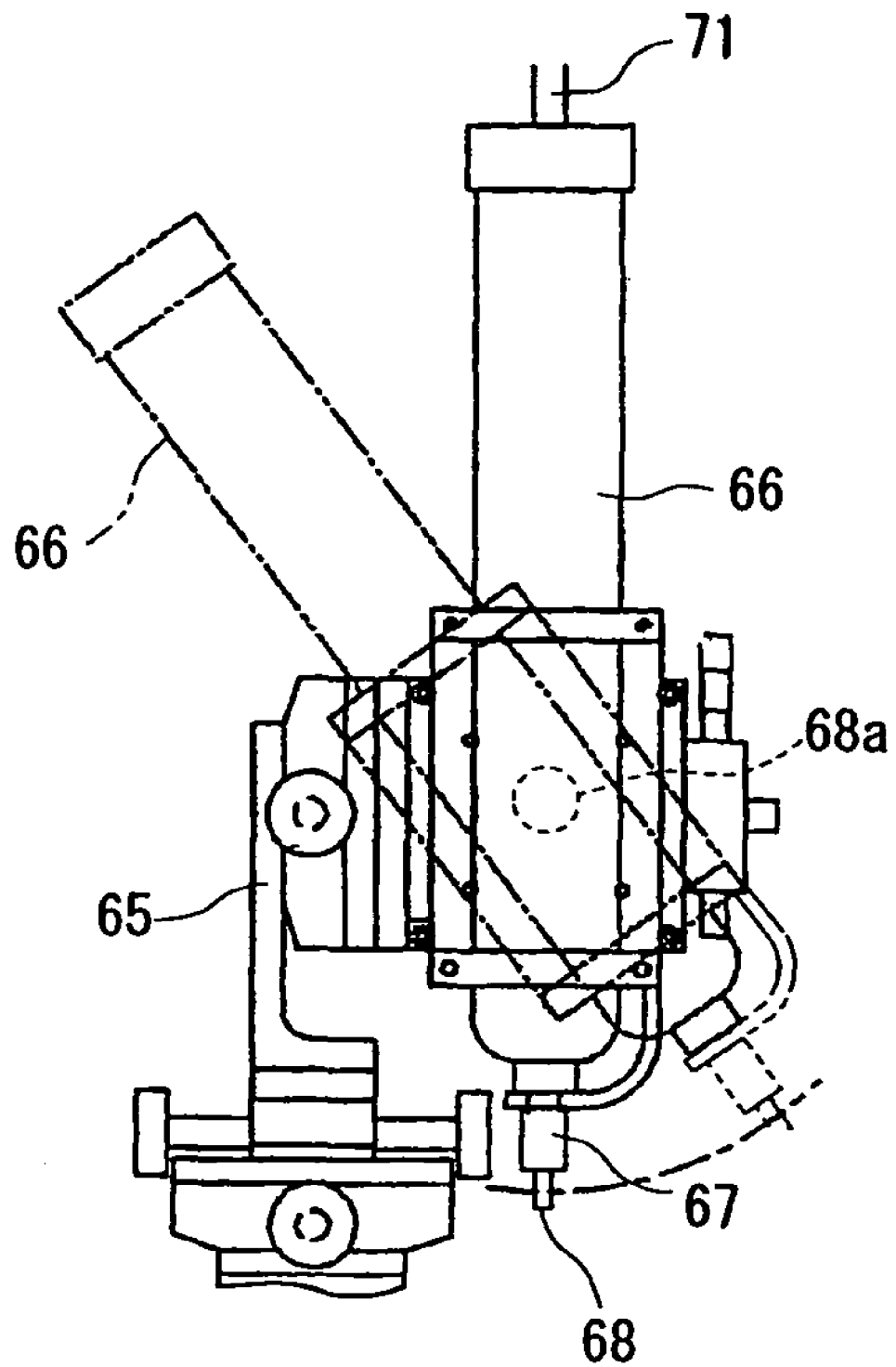
FIG. 13 is a partial enlarged view of the photochromic fluid applicator device of FIG. 12.

As shown in FIG. 12, the photochromic fluid applicator device 8 is provided with an air slide table 61 on the base stand 16, and a slide block 62 is fitted onto the air slide table 61 to be slidable in the front-to-rear (Y-axis) direction of the coating apparatus 1. A Z-axis ball screw 63 extending in the up-and-down direction is pivotally supported by the slide block 62, and a servo motor 64 is mounted at an upper end portion of the Z-axis ball screw 63. A barrel support member 65 having a ball nut is mounted on the servo motor 64, and a barrel 66 accommodating the coating fluid is supported by the barrel support member 65. As shown in FIG. 13, the barrel support member 65 is mounted such that the support angle of the barrel 66 can be varied about a pivot shaft 68a as an axis. As the slide block 62 slides on the air slide table 61 in the front-to-rear direction, the barrel 66 can move from directly above the center of the lens 15 to the radially outward side.

The coating fluid is put into the barrel 66, and the upper end of a fluid drip preventing valve 67 is detachably connected to a lower portion of the barrel 66. A nozzle 68 is detachably connected to the lower end of the fluid drip preventing valve 67.

Figure 14:
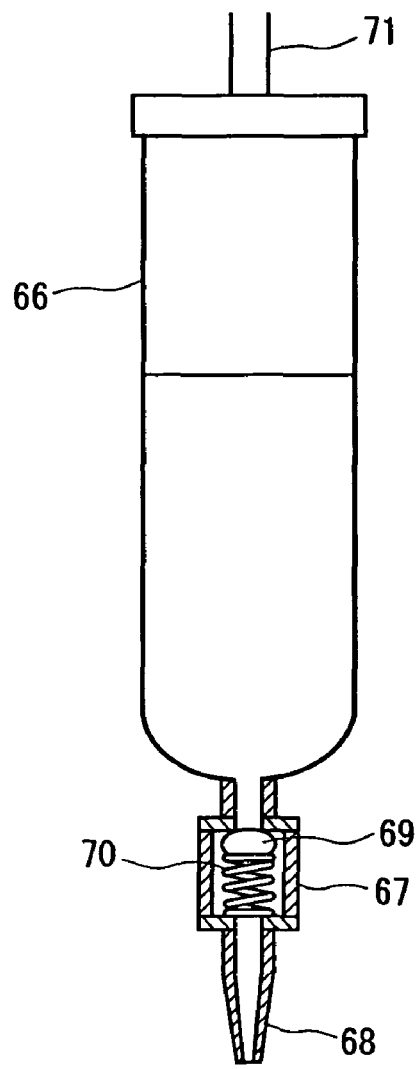
FIG. 14 is an enlarged view of a Barrel provided in the photochromic fluid applicator device of FIG. 12.

As shown in FIG. 14, a valve ball 69 of a spherical shape and a spring 70 are disposed in the fluid drip preventing valve 67, and the valve ball 69 is urged upward by the spring 70. A tube 71 is connected to an upper portion of the barrel 66, and the tube 71 is connected to an air supply means (not shown). The barrel 66 is constituted such that when air is pressure-fed from the tube 71, a plunger (not shown) within the barrel 66 presses the coating fluid to press the valve ball 69 downward in opposition to the pressing force of the spring 70, thereby opening the valve. As a result, the coating fluid is ejected through the nozzle 68.

As shown in FIG. 12, the coating film uniformizing device 9 has a Y-axis slide unit 73 provided on the base stand 16. A Y-axis servo motor 74 is mounted on the Y-axis slide unit 73, and a Y-axis ball screw 77 journaled by bearings 75, 76 is rotatably mounted on the Y-axis servo motor 74. A Z-axis slide unit 78 having a ball nut screwed to the Y-axis ball screw 77 is screwed to the Y-axis ball screw 77, and as the servo motor 74 is rotated, the Z-axis slide unit 78 can be moved in the front-to-rear direction.

A servo motor 79 is mounted on an upper portion of the Z-axis slide unit 78, and an elevating stage 83 having a ball nut screwed to a Z-axis ball screw 82 journaled by bearings 80 and 81 is mounted on the Z-axis ball screw 82. When the servo motor 79 rotates, the elevating stage 83 can move up and down. An arm 84 extending toward the spinning shaft 59 is provided at an upper portion of the elevating stage 83, and a flexible or bowable film 86, which comprises plastic film such as PET film and aims to uniformize the film thickness of the photochromic coating fluid, is suspended from the leading end portion of the arm 84. When the elevating stage 83 is moved in the lateral direction by driving the Y-axis servo motor 74, the film 86 travels in a radial trajectory on the center of the lens 15.

Figure 15:
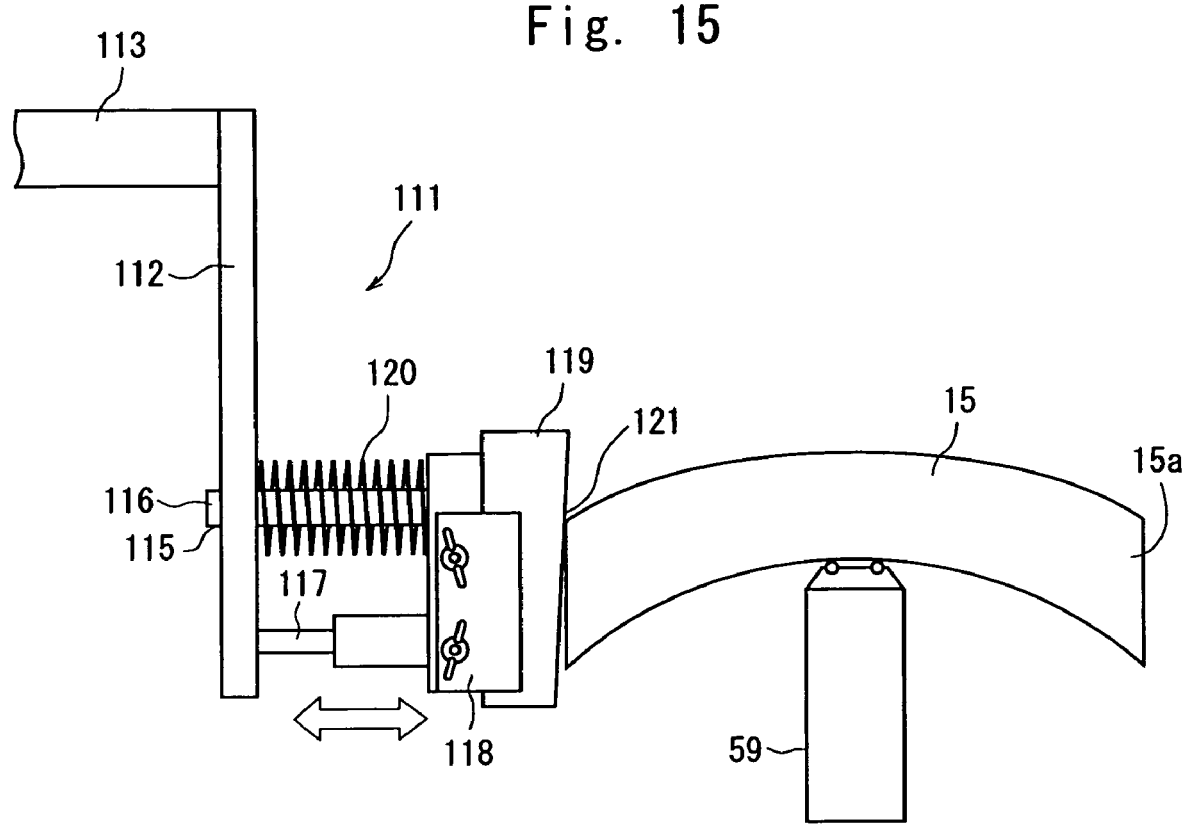
FIG. 15 is an enlarged side view of a spatula fixing jig for preventing a photochromic fluid for the lens from adhering to the side surface of the lens.

A spatula fixing jig 111 for preventing the coating fluid from adhering to the side surface 15a of the lens 15 is provided in the vicinity of the spinning shaft 59, as shown in FIG. 15. The spatula fixing jig 111 is fixed to an arm 113 by a mounting plate 112. The arm 113 is mounted on a moving means (not shown) fixed to the base stand 16 so as to be movable toward and away from the spinning shaft 59. A slide rod 116 sliding in a hole 115 formed in the mounting plate 112 is mounted on the upper side of the mounting plate 112, and a fixed rod 117 mounted on a surface of the mounting plate 112 opposing the lens 15 is provided on the lower side of the mounting plate 112. A gripping portion 118 for a spatula 119 is mounted on leading end portions of the rods 116 and 117. A spring 120 is disposed in a compressed state on the slide rod 116 between the mounting plate 112 and the gripping portion 118 so that the gripping portion 118 can slide on the fixed rod 117. The spatula 119 is arranged such that an upper end portion of a side edge 121 of the spatula 119 in contact with the lens 15 tilts toward the center of the lens 15, whereby the contact edge 121 of the spatula 119 contacts the outer peripheral surface 15a of the lens 15.

Figure 16:
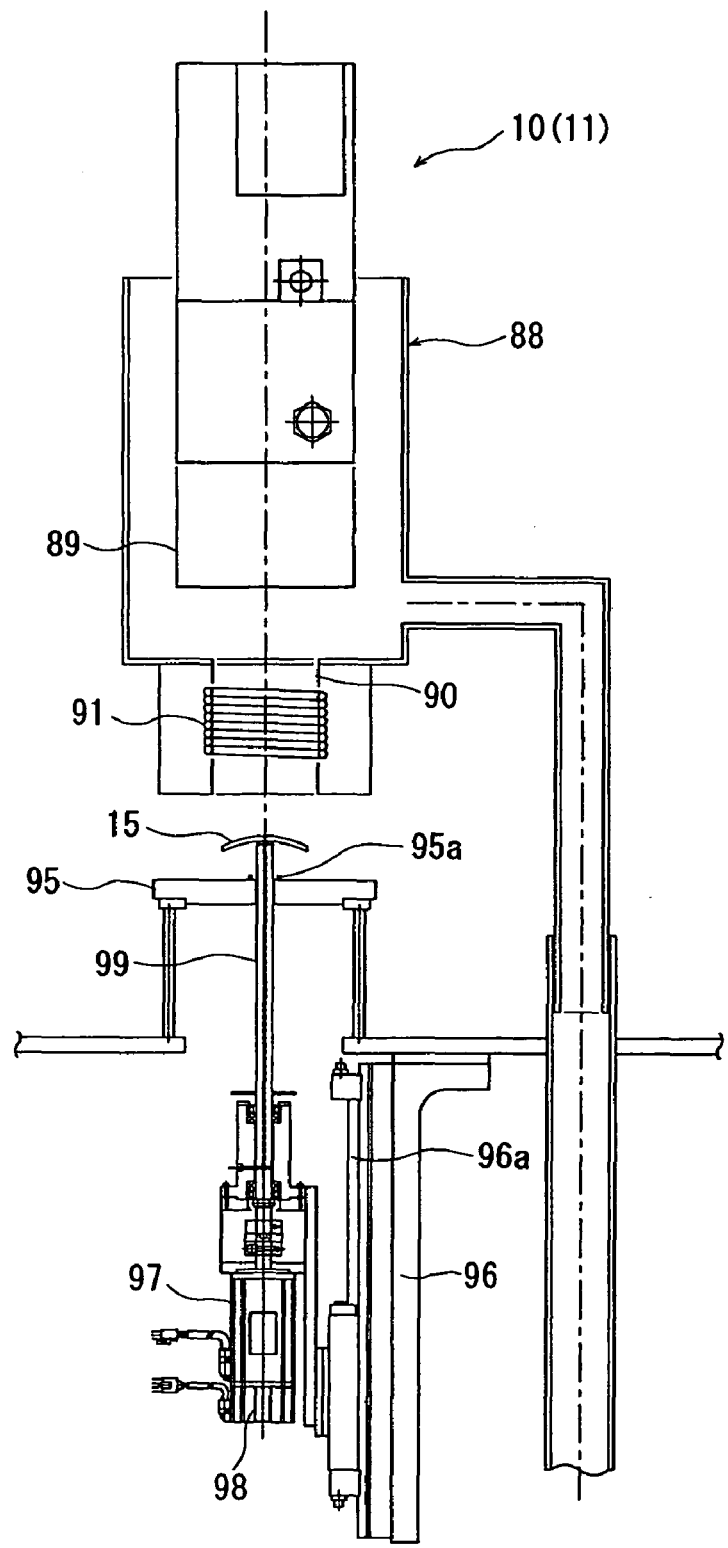
FIG. 16 is a sectional view of a UV device provided in the coating apparatus of FIG. 1.

FIG. 16 shows the UV devices 10, 11 for curing the coating fluid. A pair of the UV devices 10 and 11 are the same, and one of the UV devices, 10, will be described.

Figure 17:
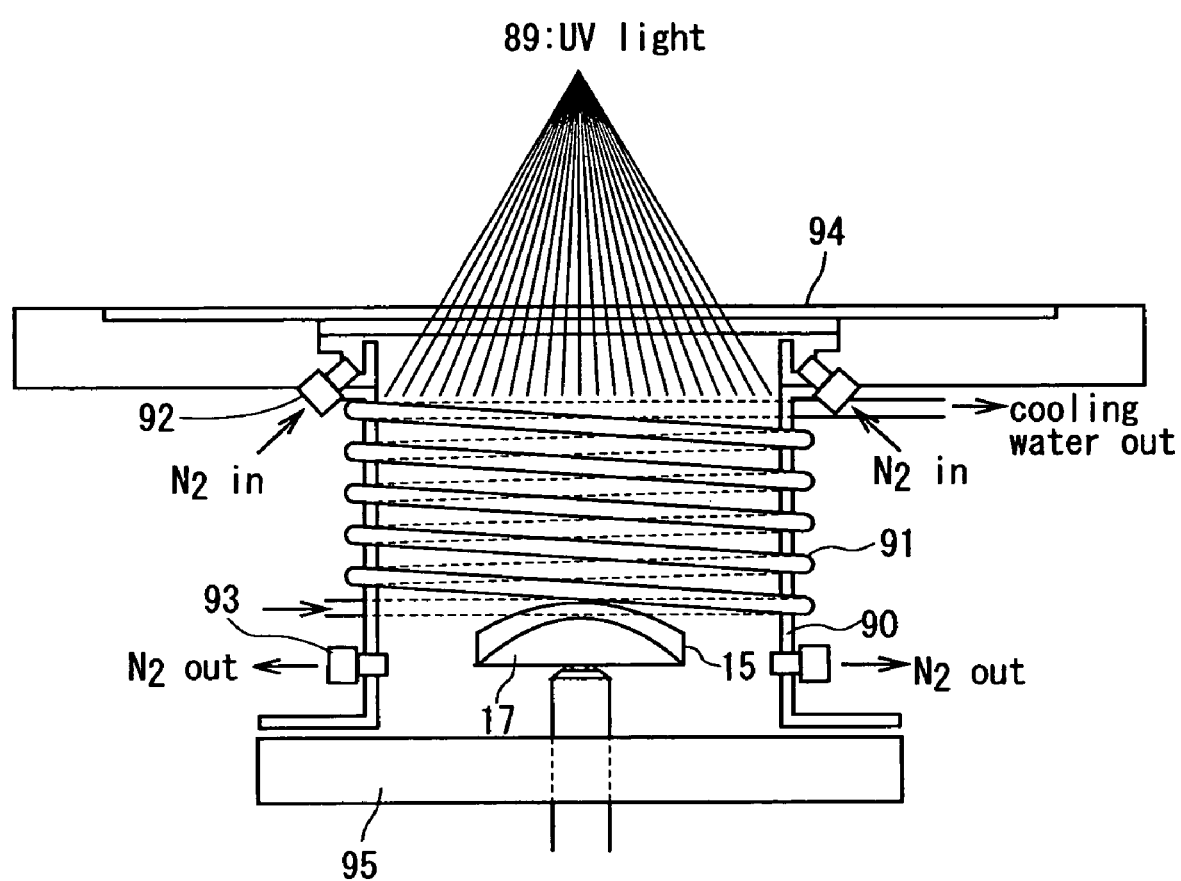
FIG. 17 is an enlarged sectional view of a UV lamp of the UV device of FIG. 16.

The UV device 10 has a main block 88 which can be raised and lowered in the up-and-down direction by an elevating means (not shown). A UV lamp 89, which is disposed directly above the lens 15 and shown in FIG. 17, is provided in the main block 88.

A cylinder 90 surrounding the lens 15 and comprising stainless steel is provided below the UV lamp 89. A cooling pipe 91 wound in a coil is disposed on the periphery of the cylinder 90, and cooling water can circulate inside the cooling pipe 91. Gas supply ports 92 are provided in an upper portion of the cylinder 90 to be capable of introducing $N_2$, an inert gas, into the cylinder 90. $N_2$ is discharged to the outside of the cylinder 90 through gas discharge ports 93 provided in a lower portion of the cylinder 90. A window 94 formed from borosilicate glass for transmission of UV light is provided in the upper portion of the cylinder 90.

The UV devices 10, 11 shown in FIG. 1 are provided on one side (right-hand side in the drawing) of the base stand 16. As shown in FIG. 16, a circular pedestal 95 protruding upwardly from the base stand 16 is formed. A guide rail 96 is provided inwardly of the base stand 16, and a lens support member 97, which slides on a rail 96a of the guide rail 96 in the up-and-down direction under an air pressure force (not shown), is provided on the guide rail 96. A servo motor 98 is fixed to the lens support member 97, and a spinning shaft 99 extending upward is mounted on the servo motor 98. The spinning shaft 99 penetrates a hole 95a formed in the circular pedestal 95. When the servo motor 98 rotates, the lens 15 rotates at an arbitrary rotational speed via the spinning shaft 99.

An O-ring is mounted in an upper end portion of the spinning shaft 99, as in the case of the spinning shaft 32 of the primer spinning device 4 shown in FIG. 7. An attraction hole is provided in a central portion of the spinning shaft 99, and the attraction hole is connected to an air suction means (not shown) to attract and support the lens 15 by the suction force of air. Therefore the spinning shaft 99 works as a lens support portion of the UV device.

Figure 18:
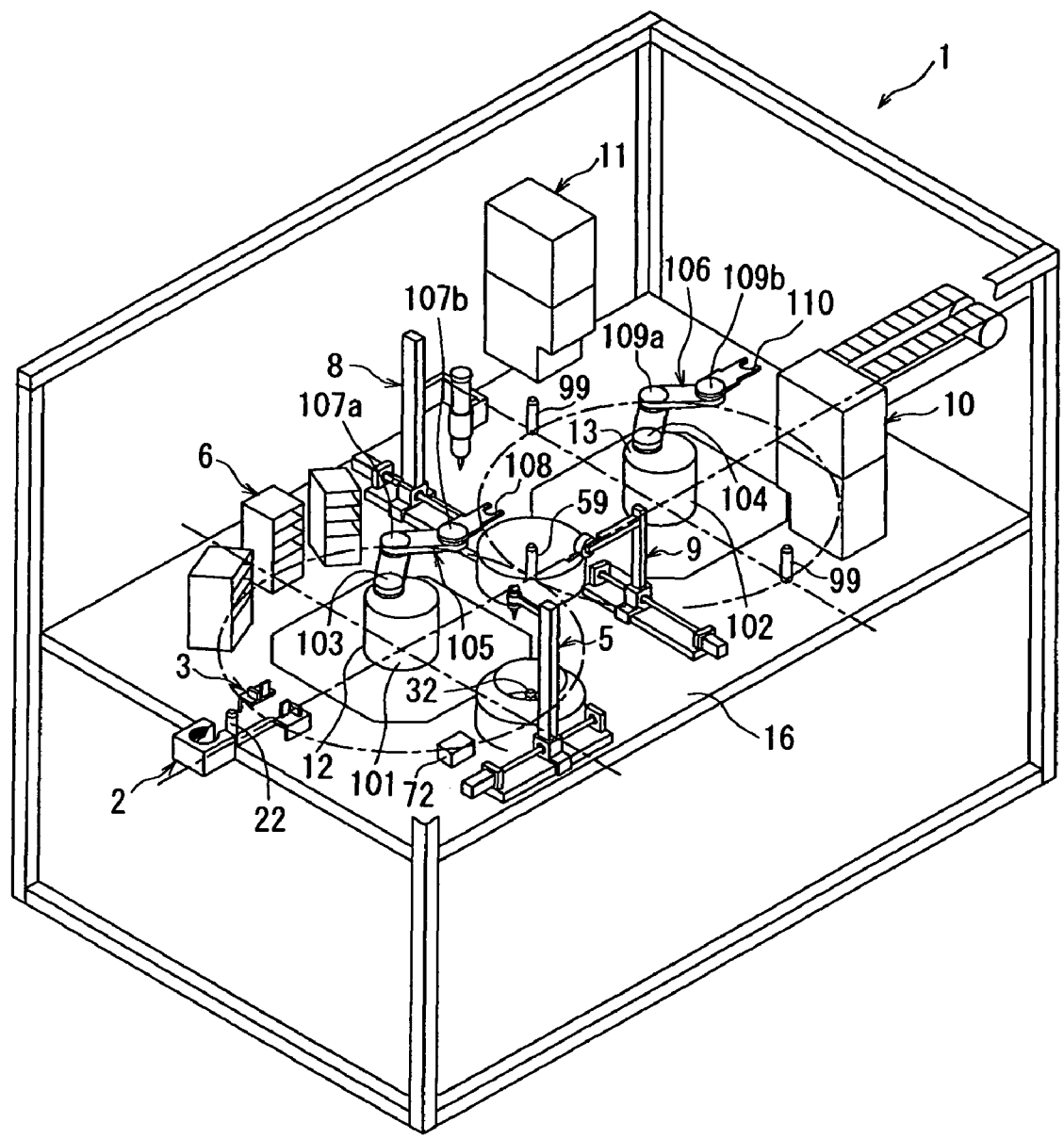
FIG. 18 is a view corresponding to the coating apparatus of FIG. 1, a perspective view for illustrating the motions of a handling device.

As shown in FIG. 18, the coating apparatus 1 is equipped with a pair of handling devices 12 and 13 for transporting the lens 15. The handling devices 12, 13 comprise ascendable and descendable rotating shafts 103, 104 provided on cylindrical bases 101, 102, and arms 105, 106 are pivotably mounted on the rotating shafts 103, 104. Joint portions 107a, 107b are formed in one arm 105, and a hand 108 for supporting the lens 15 is connected to the joint portion 107b on the leading end side. Joint portions 109a, 109b are formed in the other arm 106, and a hand 110 for supporting the lens 15 is connected to the joint portion 109b on the leading end side.

The arms 105, 106 can widen or narrow their rotation tracks in the radial direction by having their joint portions 107a, 107b and 109a, 109b bent (pivoted).

That is, the hand 108 of the one arm 105 can pivot on a track within a range including the centering rod 22 which can work as a lens support portion of the centering device 2 and lens height measuring device 3, the spinning shaft 32 of the primer spinning device 4, the lens support shaft(s) 53 of the lens drying device 6, and the spinning shaft 59 of the photochromic spinning device 7. The U-shaped hand 108 holds any of their shaft portions between its bifurcations from the lateral direction. From this state, the hand 108 is moved upward, whereby the lens 15 can be held on the hand 108. The hand 110 of the other arm 106 can pivot over the spinning shaft 59 of the photochromic spinning device 7 and the spinning shafts 99 of the UV devices 10, 11, with these shafts being included in the track of the hand 110. The U-shaped hand 110 also holds any of their shaft portions between its bifurcations. From this state, the hand 110 is moved upward, whereby the lens 15 can be held on the hand 110.

On the other hand, the hands 108, 110 holding the lenses 15 each grip the shaft portion between the bifurcations, and the hands 108, 110 are moved downward to support the lenses 15 on the shaft portions.

The procedure for a photochromic coating operation by the coating apparatus of the present embodiment will be described below.

Figure 2:
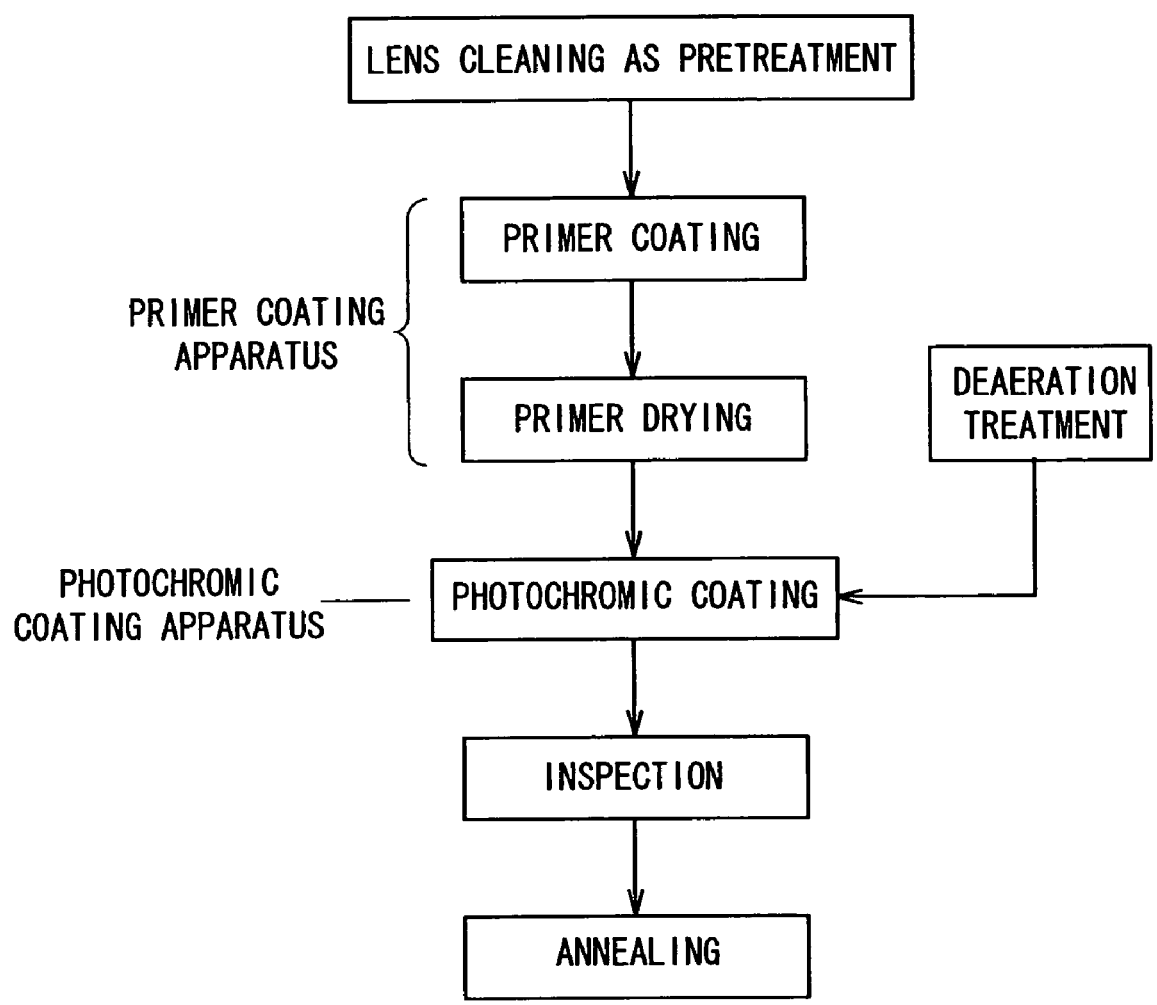
FIG. 2 is a flowchart for a coating operation using the coating apparatus according to the embodiment of the present invention.

A lens base material prepared from thiourethane resin, for example, is used as a base material, and cleaning of the lens 15 with an aqueous solution of an alkali or by ultrasonic cleaning is performed as pretreatment, as shown in the flowchart of FIG. 2.

Then, work using the coating apparatus 1 is done. First, the lens 15 is set in the centering device 2 shown in FIGS. 3 and 4. The lens 15 is centered by being adapted for any of the stepped portions d1 to d5 corresponding to the dimension of the outer diameter of the lens 15. Setting of the lens 15 is performed manually, but may be performed mechanically by the handling device.

The lens 15, which has finished centering, is placed on the centering rod 22 located directly below the center of the stepped portion d of the centering device 2. The centering rod 22 transports the lens 15 in the width direction of the coating apparatus 1, and carries it to the lens height measuring sensor 3. The centering rod 22 serves as the lens support shaft in the centering device 2, and also as the lens support shaft in the lens height measuring device 3, thus achieving commonality of the lens support portions.

Figure 19:
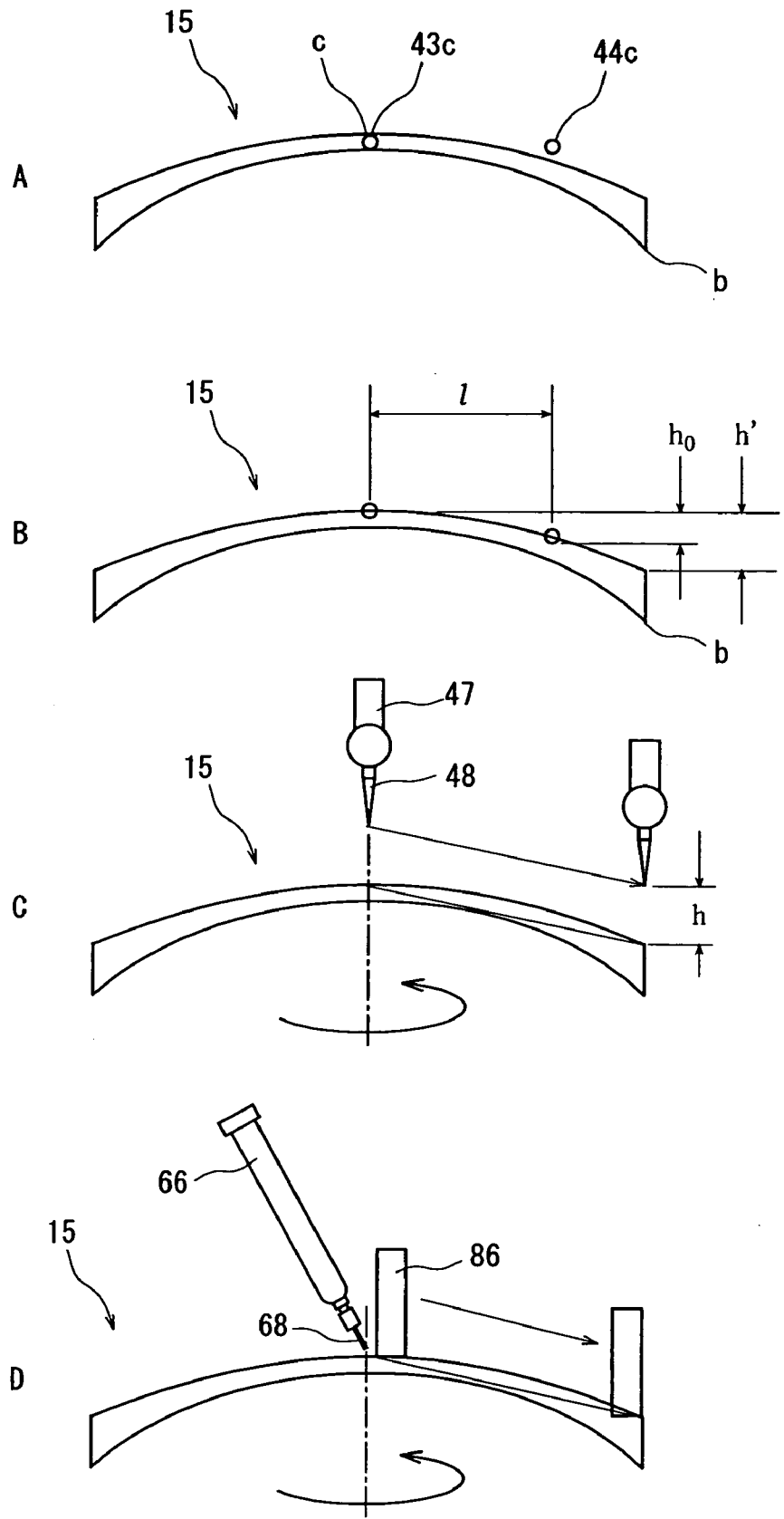
FIG. 19A is a sectional view of a state in which the height of the lens is measured with laser light from the lens height measuring sensor shown in FIG. 5.
FIG. 19B is a sectional view for illustrating how to lead to the edge position of the lens.
FIG. 19C is a sectional view of a state in which primer coating is applied to the lens.
FIG. 19D is a sectional view of a state in which photochromic coating is applied to the lens.

The lens 15 is subjected to detection by the lens height measuring device 3, which detects the height of the lens 15, and a surface height difference h' between the center c on the surface side of the lens 15 and the edge b of the lens 15 (the peripheral edge on the upper surface side of the lens), as shown in FIG. 19B. The height of the lens 15 is found in order to conform the lens 15 to the height of the nozzles 48, 68 of the applicator devices 5, 8. The surface height difference h' of the lens 15 is detected in order to find the gradient of the lens 15, thereby determining the spinning conditions for the lens 15.

A detection operation is performed, with the lens 15 being located between the sensors 24a, 25a and the mirrors 24b, 25b of the sensor units 24, 25 of the lens height measuring device 3. That is, the centering rod 22 is brought to a lower position than the sensor units 24, 25, and the centering rod 22 is raised from the lower position. By so doing, laser light 24c from one sensor 24a located at the center position of the lens 15 is refracted by the lens 15. Since the laser light 24c does not reach the mirror 24b, or has been refracted even when reaching the mirror 24b, the laser light 24c does not return to the sensor 24a. Thus, the presence of the lens 15 is detected. By measuring the center of the lens 15, the height of the lens 15 from the base stand 16 as a reference is found.

As shown in FIG. 19A, when the laser light from the sensor 24a is blocked, laser light 25c from the light emitting portion of the sensor 25a returns to the sensor 24b via the mirror 25b, thus showing the absence of the lens 15. When the lens 15 is further raised, the laser light 25c hits the lens 15, and the laser light 25c is refracted thereby. As a result, the laser light 25c does not reach the mirror 25b, or does not return to the sensor 25a because of refraction, thus leading to the recognition of the presence of the lens 15. In this manner, a surface height difference ho between the center position (vertex) of the lens 15 and an arbitrary position of the lens 15 other than the center is detected.

The surface height difference h' in the up-and-down direction between the center of the lens 15 and the edge b of the lens 15 can be found by knowing the height of the center of the lens 15, and the surface height difference ho of the lens 15 detected by the other sensor unit 25.

That is, a knowledge of the distance between two points enables the surface height difference h' to be calculated from the following equation with reference to FIG. 19B:

$$R = \frac{h_0^2 + l^2}{2h_0}, h' = R - \sqrt{R^2 - \frac{D^2}{4}} \qquad \text{[Equation 1]}$$

where R denotes the radius of curvature of the upper surface of the lens.

Practically, the surface height difference h' can be calculated using, instead of the above equation, a simplified approximation expression such as the following equation:

$$h' = H_0 D^2 / 4L^2$$

In accordance with the gradient of the lens 15 derived from the magnitude of the radius of curvature R, i.e., the curvature of the lens 15, and the surface height difference which have been calculated from the above equations, the rotational speed, the rotation time, etc. of the lens 15 in the subsequent step are determined.

In measuring the height of the lens 15, it is possible to rotate the lens 15, repeatedly measure the height at each certain angle, and obtain measurements of the height from the different angles. By such measurements from the different angles, it becomes possible to measure the height more precisely, if the lens 15 is set in an inclined manner, or when a lens with variable curvature, such as a progressive-power lens, is to be measured. In the measurement of the height of the center position of the lens 15 (the point on the axis of rotation on the surface of the lens), for example, measurements from many angles are conducted, and the minimum value is adopted, whereby a more accurate height can be obtained. In the measurement of a point other than the center, measurements from many angles are performed, and the average of the measured values is adopted, whereby the measurement error generated with the lens 15 inclined can be decreased, and a more accurate curvature of the lens 15 can be found.

Furthermore, a sensor comprising a light throwing portion (light emitting portion), which emits band-shaped laser light, and a light receiving portion composed of linearly arranged fine photodetectors, such as CCD line sensors, can be employed as the lens height measuring device 3. The use of this sensor enables the height to be measured instantaneously simply by installing the lens 15 between the light throwing portion and the light receiving portion, without the need to make measurement while changing the relative position of the sensor and the lens 15 little by little. Thus, the measuring time for the height of the lens 15 can be shortened.

The lens 15, whose curvature or gradient has been determined, is held by the hand 108 of the handling device 12, and placed on the spinning shaft 32 of the primer spinning device 4. The centered lens 15 is attracted to the center of the leading end of the spinning shaft 32 by suction.

Then, a primer coating operation for the lens 15 is performed.

First of all, immediately before the primer coating operation by the nozzle 48, a small amount of the coating fluid is ejected from the nozzle 48, with the nozzle 48 being dipped in the nozzle waiting tank 72 (a non-target ejection operation). By this non-target ejection operation, the solvent which has slightly diffused and penetrated into the nozzle 48 during dipping of the nozzle 48 is discharged out of the nozzle, whereby the coating fluid which has become nonuniform because of contamination with the solvent can be prevented from being applied to the surface of the lens 15. The non-target ejection operation may be performed outside the nozzle waiting tank 72, as long as the outside site is a place where the coating fluid is not applied onto the surface of the lens 15. Thus, the coating fluid of appropriate quality can be always obtained.

As shown in FIG. 19C, the primer coating operation is performed in the following manner: The nozzle 48 of the dispensing valve 47 is set at the center of the lens 15, and a distance h of 10 mm or less is provided with respect to a straight line drawn from the center c of the lens 15 to the edge b. The nozzle 48 is linearly moved parallel to this straight line in the radial direction of the lens 15 from directly above the center of the lens 15 to above the edge of the upper surface of the lens, with the distance h being kept.

In making this motion, the slide unit 42 is moved by driving the servo motor 40 of the applicator device 5, and the elevating block 45 is lowered by driving the servo motor 43 of the slide unit 42. By so doing, the leading end portion of the nozzle 48 can be moved parallel to the straight line connecting the center c to the edge b of the lens 15. Coating with the coating fluid is carried out, with the spinning shaft 32 being rotated by driving the servo motor 31 of the elevating block 30.

Since the primer coating fluid has low viscosity, the coating fluid is uniformly spread on the entire surface of the lens 15 by the centrifugal force of the lens 15 being rotated. Concretely, the rotational speed of the lens 15 during coating with the coating fluid is about 70 rpm and, after coating with the coating fluid, the lens 15 is rotated for 5 seconds or so at a rotational speed of 1,000 rpm to adjust the film thickness. The thickness of the coating layer is 7 μm. These rotational speeds are varied according to the gradient of the lens 15 or the ambient temperature for the lens 15, and are adjusted to attain a proper film thickness.

As described above, the primer coating fluid has low viscosity, thus causing a possibility for the coating fluid to extend from the side surface 15a of the lens 15 further to its back. During (or immediately after) coating or spin coating with the coating fluid, the solvent is jetted by the jet nozzle 85a of the back cleaning nozzle 85 toward the back of the lens 15, while the lens 15 is being rotated. The coating fluid adhering to the back of the lens 15 can be washed off the lens 15 using the jet of the solvent.

The reason why the coating fluid is removed from the back of the lens 15 is as follows:

The lenses include a finished lens formed by finishing both surfaces of a lens to predetermined optical surfaces during transfer from a mold in a manufacturing process, and a semifinished lens formed by grinding the back of a lens to an optical surface by polishing. With the finished lens, if the coating fluid adheres to the back of the lens and is cured, the lens becomes a defective product due to contamination. With the semifinished lens, the back of the lens is polished after coating in order to impart dioptric power, thus minimizing the influence of the adhered coating fluid. Operation continued with the coating fluid adhering to the back of the lens produces the effect of preventing the coating fluid from adhering to devices, such as transport arms located downstream.

After completion of the coating operation, the tip of the nozzle 48 is dipped in the solvent contained in the nozzle waiting tank 72 in order to prevent drying of the nozzle 48 of the dispensing valve 47. This prevents the solidification, etc. of the primer coating fluid and, even after a long time interval until next coating, the coating operation can be immediately performed.

After the surface of the lens 15 is coated with the primer coating fluid, the lens 15 is transported from the spinning shaft 32 to the lens drying device 6 by the handling device 12.

In the lens drying device 6, the lens 15 is supported on the top of the lens support shaft 53 for drying treatment in which the coating fluid is dried (solidified) for 15 minutes at room temperature. The coating fluid comprising a urethane primer has the property of becoming solid when exposed to moisture. In the lens drying device 6, after the coating fluid on the lens 15 is solidified, the lens 15 is withdrawn from the lens drying device 6. The operation up to this stage is the primer coating operation, and the dried lens 15 is subjected to a photochromic coating operation in a subsequent step.

In the coating apparatus 1, while the coating operation is being performed on the lens 15 by the primer fluid applicator device 5, the shape of the lens 15 is detected by the lens height measuring sensor 3, and the lens 15 is transported to the centering device 2. In this manner, the lenses 15 are smoothly subjected to the coating operation, one after another. In the drying operation for the lens 15 which takes a relatively long time, many of the lens support shafts 53 are disposed to dry a plurality of the lenses 15 at any time. Thus, the primer coating operation for the lens 15 is performed efficiently, and many of the lenses 15 are primer-coated in a short time.

Next, a photochromic coating operation for the lens will be described.

In this coating operation, the lens 15 having the primer coating layer solidified is moved by the handling device 12 from the lens drying device 6 to the spinning shaft 59 of the photochromic spinning device 7.

As shown in FIG. 12, the lens 15 is supported by the spinning shaft 59, and the slide block 62 is conveyed on the air slide table 61 of the applicator device 8, whereby the nozzle 68 of the barrel 66 is located directly above the lens 15. The lens 15 is rotatably supported on the spinning shaft 59, and the barrel 66 placed in an inclined state, as indicated by the imaginary lines, ejects the photochromic coating fluid from the nozzle 68 onto the surface of the lens 15. In the present embodiment, the coating fluid is ejected onto the surface of the lens 15, with the tip of the nozzle 68 being fixed at the central position of the lens 15 (the position on the axis of rotation of the lens 15 and 1 mm or so above the surface of the lens 15). The reason why the nozzle 68 is inclined is that interference between the film 86 and the nozzle 68 is prevented by the inclination. The nozzle 68 may have the tip bent in an L-shape to avoid interference with the film 86. The spinning shaft 59 has the same diameter as a whole, and its shaft diameter is advisably small. If the shaft diameter is large, or a large-diameter portion is formed, the coating fluid scatters during rotation of the shaft, and adheres to the lens 15 again, causing failure.

As shown in 19D, the coating fluid ejected onto the lens 15 is spread throughout the lens by contact with a lower edge portion of the flexible film 86 which is a spread assisting means. The rotational speed of the lens 15 and the movement of the film 86 are determined and carried out in consideration of the gradient of the lens determined by height measurement of the lens, under conditions under which the coating fluid supplied to the central portion of the lens 15 is spread throughout the upper surface of the lens 15 most efficiently.

The film 86 transferred onto the lens 15 by the coating film uniformizing device 9 warps on the lens 15, and when the lens 15 is rotated in this state, the coating fluid partly held back by the film 86 transiently accumulates on the lens 15. The accumulated coating fluid is spread to a nearly uniform thickness by the restoring force of the film 86. With this state being kept, the film 86 is gradually moved along a linear track from the center of the lens 15 to the edge b (see FIG. 19). During movement of the film 86, the degree of warpage of the film 86 changes according to the curved surface of the lens 15, but its restoring force minimally changes.

By making use of the warpage of the film 86, the coating fluid can be spread to cover the entire surface of the base material beautifully (in a nearly uniform thickness without wetting unevenness), without strict positional control, in the up-and-down direction, of the film 86 according to the curved surface of the lens. Moreover, the coating fluid can be spread without thickness irregularity. Thus, the utilization factor of the coating fluid can be increased, and the high viscosity fluid, even in a small amount, can be coated on the whole of the lens 15.

At this stage, the amount of the photochromic coating fluid on the lens 15 is larger then the desired film thickness of the photochromic film, and a surplus of the coating fluid on the lens 15 needs to be removed until the desired amount of the fluid is reached. An appropriate amount of the coating fluid is attained by performing an operation for rotating the lens 15 to throw off the coating fluid on the lens 15. The rotational speed of the lens 15 is determined by conditions suitable for the temperature in the apparatus and the gradient of the lens 15. For example, the lens 15 is spun, for example, at 600 rpm.

As shown in FIG. 15, the coating operation is designed to bring an edge portion of the spatula 119 of the spatula fixing jig 111 into contact with an upper (corner) portion of the outer peripheral surface 15a of the lens 15. On this occasion, the arm 113 is advanced toward the spinning shaft 59 by the moving means (not shown) to adjust the position of the spatula 119 automatically according to the diameter of the lens to be coated. Since the upper end portion of the contact edge 121 of the spatula 119 is inclined toward the center of the lens 15, the contact edge 121 of the spatula 119 can remove the coating fluid which has accumulated at the outer peripheral edge of the surface of the lens 15. Below the contact edge 121 of the spatula 119, a gap is formed between the contact edge 121 and the outer peripheral surface 15a of the lens 15. Thus, the coating fluid is guided toward the spatula 119 by the centrifugal force during rotation of the lens 15, and can be prevented from adhering to the outer peripheral surface 15a of the lens 15. As a result, the coating fluid can be prevented from dropping from the edge of the lens 15 onto the outer peripheral surface 15a.

The spring 120 of the spatula fixing jig 111 plays a role in pressing the gripping portion 118, which supports the spatula 119, toward the lens 15 with a nearly constant force. The coating fluid removed by the spatula 119 drips into the tray 60 for recovery.

If coating is performed without contact with the spatula 119, the coating fluid may adhere to the side surface of the lens 15, and may be UV-cured by the UV device 10 to be described later. Annealing after UV curing, optical distortion may be caused to the lens 15 by the coating fluid unevenly adhering to the side surface of the lens 15. The lens 15 may have a lens diameter increased by a value corresponding to the amount of the coating fluid adhering to its side surface, causing the defect that its size does not fit the size of a dedicated jig in a post-treatment step such as hard coating or anti-reflection coating.

To avoid these problems, it is necessary to polish the side surface of the lens 15 by a polishing device or the like, after UV curing, thereby removing the coating fluid that has adhered, thus complicating the manufacturing process. In the present embodiment, during coating, the spatula 119 is brought into contact with the lens 15, thus making it possible to prevent the coating fluid from adhering to the outer peripheral surface 15a of the lens 15, thereby omitting polishing.

The photochromic coating fluid has a high viscosity in comparison with the primer coating fluid, and relatively minimally extends to the back of the lens. However, if the curvature of the back of the lens is small, even the photochromic coating fluid may extend to the back of the lens. When coating is performed in such a case, with the spatula 119 making contact with the lens, the coating fluid can be prevented from extending not only to the side surface of the lens 15, but also to the back of the lens 15. Thus, contamination of the back of the lens with the coating fluid can be prevented.

The above removal of a surplus of the photochromic coating fluid using the spatula 119 is particularly effective for a finished lens in which the back of the lens 15 is not polished, as stated earlier.

After coating of the lens 15 with the photochromic coating fluid is completed, the lens 15 is moved by the other handling device 13 from the spinning shaft 59 of the applicator device 8 to the spinning shaft 99 provided in the UV device 10 (or UV device 11) and supported thereon. The spinning shaft 59 is incorporated into the tracks of both of one handling device 12 and the other handling device 13.

As shown in FIG. 16, the lens 15 is surround by the cylinder 90 of the UV device 10, and the interior of the cylinder 90 is purged with nitrogen. The reason for providing a nitrogen atmosphere is that oxygen, if present, inhibits the polymerization reaction of the coating fluid, making curing difficult. During the period from the start of purging with nitrogen within the cylinder 90 until completion of the curing of the coating film by UV light, $N_2$ is always supplied into the cylinder 90 in order to prevent an increase in the oxygen concentration within the cylinder 90. At this time, after lighting of the UV lamp 89, an electromagnetic valve installed in one of bifurcations of a bifurcated $N_2$ supply line (not shown) is closed, whereby the flow rate of $N_2$ supplied from the gas supply ports 92 can be restricted to a minimum required amount. Before lighting of the UV lamp 89, the atmosphere within the cylinder 90 is rapidly purged with a large flow rate of $N_2$. After lighting of the UV lamp 89, the flow rate of $N_2$ is kept to a minimum, so that the consumption of $N_2$ can be saved.

In the UV device 10, when the height position of the UV lamp 89 is adjusted to an appropriate position, the lens 15, while being rotated, is irradiated with light from the UV lamp 89 to cure the coating. The reason for rotating the lens 15 is that the rotation decreases a fluid accumulation region in a peripheral edge portion of the lens 15 to achieve uniform application of UV light. The rotational speed of the lens 15 during irradiation from the UV lamp 89 is the order of 150 rpm.

During lighting of the UV lamp 89, the suction force of the air suction means (not shown) acting on the spinning shaft 99 is decreased to a minimum required level. By so doing, the lens 15, which is heated during UV irradiation and is apt to deform, can be kept from deforming under the suction force.

The window 94 installed between the UV lamp 89 and the lens 15 allows UV light to be transmitted into the cylinder 90, and plays the role of a filter for cutting light of a wavelength in the vicinity of 300 nm or shorter.

The reason for cutting the wavelength in the vicinity of 300 nm or shorter is that depending on the type of the photochromic coating fluid, wrinkles occur in the coating applied, failing to obtain a uniform film. The reason why borosilicate glass is used as the material is that it has heat resistance and does not break under the heat of the UV lamp.

After completion of photochromic coating, the lens is inspected for the state of adhesion of the photochromic coating layer. A defective product is rejected, and an acceptable product is annealed. This annealing treatment is heat treatment performed for 1 hour at 110° C.

In this manner, a photochromic coating film is formed on the lens 15, coating can be carried out using a coating fluid of a uniform concentration, and a photochromic lens of a high quality can be produced.

The embodiment of the present invention has been described above, but needless to say, various modifications or changes of the present invention are possible based on the technical ideas of the present invention.

For example, when the lens 15 is supported, a pad comprising silicone rubber or silicone gum can be mounted so as to fill up a part or all of a concavity of the back of the lens 15, and the lens 15 and the pad can be supported as a unit. The use of the pad allows heat, which occurs during UV irradiation, to escape from the lens 15 to the pad, thereby suppressing the temperature rise of the lens 15. Even when a coating layer is formed on the lens thin at the center, therefore, thermal deformation of the lens can be prevented by use of the pad.

In connection with the sensor units 24, 25, the line connecting the sensor 24a and the mirror 24b is located at the same horizontal height as the line connecting the other sensor 25a and the other mirror 25b, but one of the sensors may be located at a different height position to provide a height difference between the two sensors. In this case, the edge position of the lens 15 is determined in consideration of the height difference between the sensors.

According to the present embodiment, photochromic coating is taken as an example. However, the present invention can be applied to other coating technologies.

In connection with the sensor units 24, 25, the two sensors are used, but it is possible to use only one sensor, change the sensor position, and detect the height positions of the central portion and other point of the lens, thereby performing detection. However, this procedure takes time.

In the photochromic coating operation, the spatula is brought into contact with the side surface of the lens 15, whereby the coating fluid which has arrived at the outer peripheral edge of the lens 15 under the centrifugal force of the lens 15 can be prevented from adhering to the side surface of the lens 15.

According to the coating apparatus of the present invention, primer coating and photochromic coating can be performed by the single coating apparatus.

In the above-described invention, the lens transport means is a pair of handling devices each having an arm-shaped member pivoting about a shaft; respective lens support portions of the lens height measuring sensor, the primer spinning device, the lens drying device, the photochromic spinning device, and the UV device are divided into a former and a latter according to the sequence of a coating operation for the lens; one of the handling devices of the pair of handling devices is disposed inside a track of the former, and the other handling device is disposed inside a track of the latter; and of the respective lens support portions of the former, the lens support portion used finally in the sequence of the operation is disposed, together with the one handling device, inside the track of the other handling device. Thus, the handling device follows a circular track, so that its movement is not complicated. Moreover, the single lens support portion is disposed, together with the one handling device, inside the track of the other handling device. Thus, the number of the handling devices can be decreased, and a next operation can be performed efficiently.

In the above-described invention, a plurality of the lens support portions of the lens drying device are arranged, and a plurality of the UV devices are arranged. Thus, drying of the primer coating fluid taking a relatively long time, and curing of the photochromic coating fluid by the UV operation can be performed in parallel. Hence, coating of many lenses can be carried out by the single apparatus.

In the above-described invention, a lens height difference between two points at the center of the lens surface of the lens supported by the centering jig and at other location on the lens surface spaced from the center is detected by the sensor provided in the lens height measuring sensor. Thus, the coating operation can be performed regardless of the shape of the lens.

In the above-described invention, the lens height measuring sensor is equipped with two sets of light emitters and light receivers, and determines the height of the lens by allowing the lens to block light emitted from the light emitter and reaching the light receiver. Thus, detailed and accurate measurement can be made utilizing the characteristics of the lens.

In the above-described invention, the primer coating fluid is coated onto the surface of the lens while the ejection nozzle is being moved at a distance from, and along, a straight line connecting the center of the surface of the lens to an edge portion of the surface of the lens. Thus, the coating fluid can be coated onto the central portion to an outer side of the lens.

In the above-described invention, the coating film uniformizing device is provided for spreading the photochromic coating fluid on the surface of the lens by an edge portion of the film during coating of the lens with the photochromic coating fluid, and while the lens is being rotated, the photochromic coating fluid is spread by the coating film uniformizing device, with the film being moved along a linear track connecting a central portion of an upper surface of the lens to an edge portion on the upper surface of the lens. Thus, the photochromic coating fluid having high viscosity can be spread effectively toward the outer side of the lens.

In the above-described invention, one of the lens support portions is formed to be movable, and two of the respective lens support portions are rendered common by the one lens support portion. Thus, the number of the lens support shafts can be decreased.

In the above-described invention, the cleaning nozzle having a tip portion pointed toward the back of the lens is disposed below the lens supported by the primer spinning device, and a solvent is gushed by the cleaning nozzle toward the back of the lens. Thus, the primer coating fluid extending to the back of the lens can be cleaned with the solvent.

In the above-described invention, the waiting tank storing a solvent for preventing solidification of the primer coating fluid is provided within a range of movement of the ejection nozzle of the primer coating device, and a tip portion of the ejection nozzle is dipped in the solvent when the ejection nozzle is not in operation. Thus, solidification, etc. of the primer coating fluid can be prevented, and after a long-term coating interval, the coating operation can be performed immediately.

In the above-described invention, the film-shaped spatula capable of contacting an upper portion of the side surface of the lens is disposed in the surroundings of the photochromic spinning device, and the spatula is brought into contact with the side surface of the lens during coating with the photochromic coating fluid. The photochromic coating fluid, which is about to drop from the upper surface of the lens to the side surface of the lens, can be removed by the spatula to prevent adhesion of the coating fluid to the side surface of the lens.

What we claim is:

1. A coating apparatus, comprising:
   a centering device for determining a center of a lens;
   a lens height measuring device for measuring a gradient of the lens ranging from a center on a face side of the lens to an edge portion on the face side of the lens;
   a primer fluid applicator device for coating a primer coating fluid onto the face side of the lens by an ejection nozzle;
   a primer spinning device for rotating the lens coated with the primer coating fluid at a rotational speed conformed to the gradient of the lens;
   a drying device for drying the primer coating fluid coated onto the lens;
   a photochromic fluid applicator device for coating a photochromic coating fluid onto a primer film coated onto the lens;
   a photochromic spinning device for rotating the lens coated with the photochromic coating fluid at a rotational speed conformed to the gradient of the lens; and
   a UV device for irradiating the lens, which has been coated with the photochromic coating fluid, with UV light in a nitrogen atmosphere to cure a coating layer,
   wherein each of the centering device, the lens height measuring device, the primer spinning device, the drying device, the photochromic spinning device, and the UV device has a lens support portion for supporting the lens, and
   a lens transport means capable of transferring the lenses is provided.

2. The coating apparatus according to claim 1, wherein
   the centering device, the lens height measuring device, the primer spinning device, the drying device, the photochromic spinning device, and the UV device are being divided into a former group and a latter group according to a sequence of a coating operation for the lens; the lens transport means comprises a pair of handling devices each having an arm-shaped member pivoting about a shaft;
   each of lens support portions of devices belonging to the former group is being disposed inside a track of one of the handling devices of the lens transport means, and each of lens support portions of devices belonging to the latter group is being disposed inside a track of the other handling device of the lens transport means; and
   of the respective lens support portions of the former group, the lens support portion used finally in the sequence of the operation is being disposed not only inside the track of the handling device but inside the track of the other handling device.

3. The coating apparatus according to claim 2, wherein
the former group includes the centering device, the lens height measuring device, the primer spinning device, the drying device, and the photochromic spinning device;
the latter group includes the UV device and
the lens support portion of the photochromic spinning device is disposed inside the tracks of both the one handling device and the other handling device.

4. The coating apparatus according to claim 1, wherein a plurality of the lens support portions of the lens drying device are arranged, and a plurality of the UV devices are arranged.

5. The coating apparatus according to claim 1, wherein a lens height difference between two points at a center of a lens surface of the lens supported by the centering device and at other location on the lens surface spaced from the center is detected by a sensor provided in the lens height measuring sensor.

6. The coating apparatus according to claim 5, wherein
the lens height measuring device comprises at least one set of a light emitter for emitting a light and a light receiver for detecting the light emitted from the light emitter; and
the height of the lens is determined based on an information resulting from interruption of the light detecting at the light receiver by the lens.

7. The coating apparatus according to claim 1, wherein the primer coating fluid is coated onto the surface of the lens while the ejection nozzle of the primer fluid applicator device is being moved at a distance from, and along, a straight line connecting the center of the surface of the lens to an edge portion of the surface of the lens.

8. The coating apparatus according to claim 1, which further comprising a coating film uniformizing device having a flexible film for spreading the photochromic coating fluid on the surface of the lens, wherein the coating film uniformizing device spreads the photochromic coating fluid on the surface of the rotating lens by moving the flexible film along a linear track connecting a central portion of an upper surface of the lens to an edge portion of the upper surface of the lens and by contacting an edge portion of the flexible film with the photochromic coating fluid during the movement.

9. The coating apparatus according to claim 1, wherein one of the lens support portions is formed to be movable, and two of the respective lens support portions are rendered common by the one lens support portion.

10. The coating apparatus according to claim 1, which further comprising a cleaning nozzle for cleaning a back of the lens supported by the primer spinning device by discharging a solvent toward the back of the lens.

11. The coating apparatus according to claim 1, which further comprising a waiting tank provided within a range of movement of the ejection nozzle of the primer coating device, wherein the waiting tank stores a solvent for preventing solidification of the primer coating fluid by dipping the ejection nozzle of the primer coating device in the solvent when the ejection nozzle is not in operation.

12. The coating apparatus according to claim 1, which further comprising a spatula disposed in surroundings of the photochromic spinning device, wherein the spatula is capable to contact with a side surface of the lens supported by the photochromic spinning device during coating with the photochromic coating fluid.

* * * * *